(12) United States Patent
Takamatsu et al.

(10) Patent No.: US 12,739,351 B2
(45) Date of Patent: Sep. 15, 2026

(54) PROJECTION SYSTEM, CONTROL DEVICE, AND CONTROL METHOD

(71) Applicant: SONY GROUP CORPORATION, Tokyo (JP)

(72) Inventors: Takashi Takamatsu, Tokyo (JP); Hiroshi Takeuchi, Tokyo (JP); Seishi Tomonaga, Tokyo (JP); Motosuke Ohmi, Tokyo (JP); Koji Miura, Tokyo (JP); Hiroshi Imamura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 19/120,858

(22) PCT Filed: Oct. 3, 2023

(86) PCT No.: PCT/JP2023/036014

§ 371 (c)(1),
(2) Date: Apr. 14, 2025

(87) PCT Pub. No.: WO2024/084951

PCT Pub. Date: Apr. 25, 2024

(65) Prior Publication Data

US 2026/0067431 A1 Mar. 5, 2026

(30) Foreign Application Priority Data

Oct. 19, 2022 (JP) ................................ 2022-167530

(51) Int. Cl.
*H04N 1/00* (2006.01)
*H04N 9/31* (2006.01)

(52) U.S. Cl.
CPC ....... *H04N 9/3141* (2013.01); *H04N 1/00549* (2013.01)

(58) Field of Classification Search
CPC ............. H04N 1/00549; H04N 23/682; H04N 2201/02491
See application file for complete search history.

(56) References Cited

U.S. PATENT DOCUMENTS

2009/0322968 A1* 12/2009 Kobayashi ........... H04N 9/3194
348/E3.048
2016/0025973 A1* 1/2016 Guttag .................. B60K 35/23
345/7

FOREIGN PATENT DOCUMENTS

JP 2006-113272 A 4/2006
JP 2012-047850 A 3/2012
(Continued)

OTHER PUBLICATIONS

International Search Report and Written Opinion of PCT Application No. PCT/JP2023/036014, issued on Dec. 19, 2023, 08 pages of ISRWO.

*Primary Examiner* — Michael H Hong
(74) *Attorney, Agent, or Firm* — CHIP LAW GROUP

(57) ABSTRACT

The present disclosure relates to a projection system, a control device, and a control method capable of effectively suppressing vibration generated in an image.
A first acceleration signal output from a first acceleration sensor provided at a bottom of a vehicle is analyzed, vibration to be generated in a screen and a projector device fixed to a ceiling of the vehicle is predicted, a predicted correction value based on the prediction is obtained, and a correction value based on actual measurements is obtained in accordance with relative behavior of the screen and the projector device. Control calculation is then performed by feeding back the correction value to the predicted correction value, and an amount of drive of an actuator for suppressing vibration of an image projected on the screen is obtained.
(Continued)

The present technology can be applied to, for example, a projection system mounted on a vehicle.

10 Claims, 21 Drawing Sheets

(56) References Cited

FOREIGN PATENT DOCUMENTS

| | | | |
|---|---|---|---|
| JP | 2017-146520 | A | 8/2017 |
| WO | 2019/181233 | A1 | 9/2019 |
| WO | 2021/166801 | A1 | 8/2021 |
| WO | 2021/256483 | A1 | 12/2021 |

* cited by examiner

| RELATIVE DISPLACEMENT [mm] | X | ≈ 0 |
|---|---|---|
| | Y | ≈ 0 |
| | Z | ≈ 0 |
| PROJECTOR ROTATION ANGLE [rad] | ROLL | ≈ 0 |
| | PITCH | 0. 004 |
| | YAW | 0 |
| SCREEN ROTATION ANGLE [rad] | ROLL | ≈ 0 |
| | PITCH | 0. 05 |
| | YAW | 0 |

35
VEHICLE ACCELERATION SIGNAL
SCREEN ACCELERATION SIGNAL
PROJECTOR ACCELERATION SIGNAL
41
PREDICTION CALCULATION UNIT
INPUT SIGNAL ANALYSIS SECTION
45
CALCULATION PROCESSING SECTION
46
CORRECTION VALUE CALCULATION UNIT
42
43
CONTROL CALCULATION UNIT
ANGLE DIFFERENCE CALCULATION SECTION
47
DRIVE AMOUNT CALCULATION SECTION
48
44
ACTUATOR DRIVE UNIT
DRIVE SIGNAL

FIG. 4

FIG. 6A
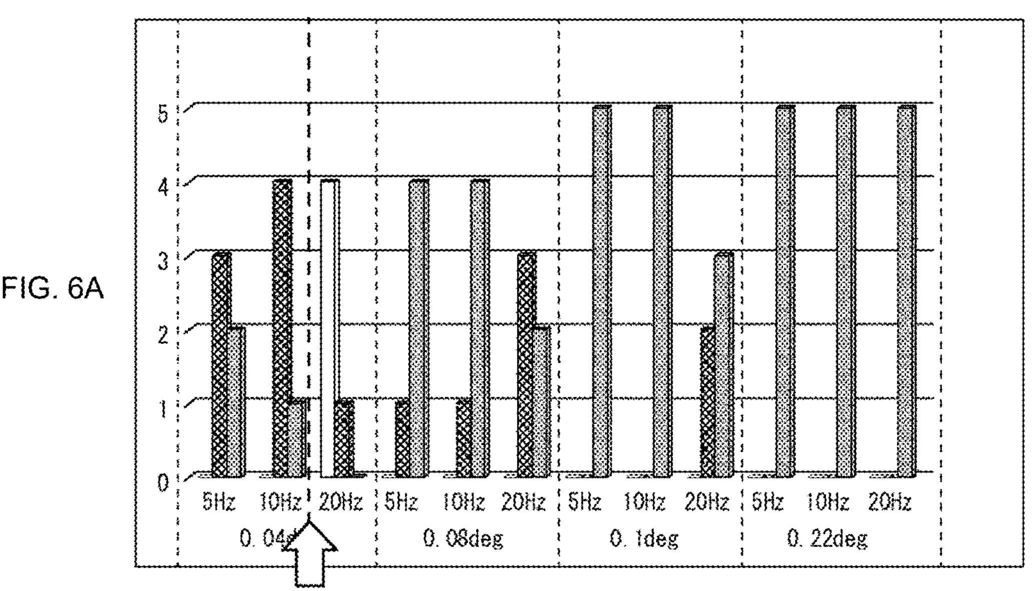
FIG. 6B
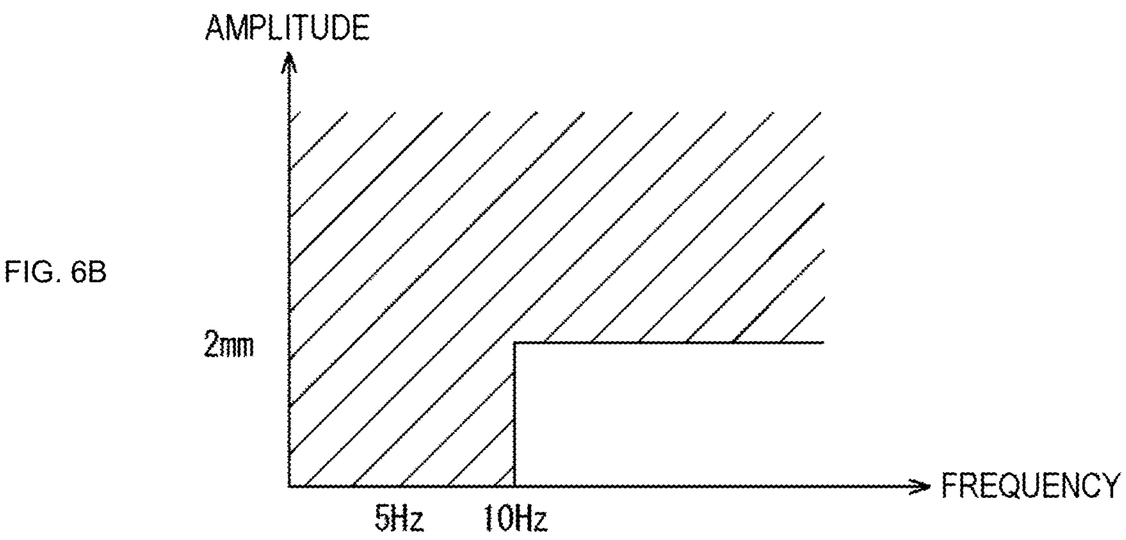

FIG. 7

BACK SIDE

AMPLITUDE

AMPLITUDE

24

22

STILL POSITION

24

22

FRONT SIDE

AMPLITUDE

AMPLITUDE

24

22

24

22

ANGLE AMPLITUDE 22
23
24
34
22
55
54
53
PROJECTION LIGHT
52
51

34a
PROJECTION LIGHT
56
55
52
51
53

34b
53
PROJECTION LIGHT
57
55
52
51

34c
52
PROJECTION LIGHT
51
53
MOVE AND DEFORM IMAGE IN PIXELS 34d
58
PROJECTION LIGHT
51
55
53

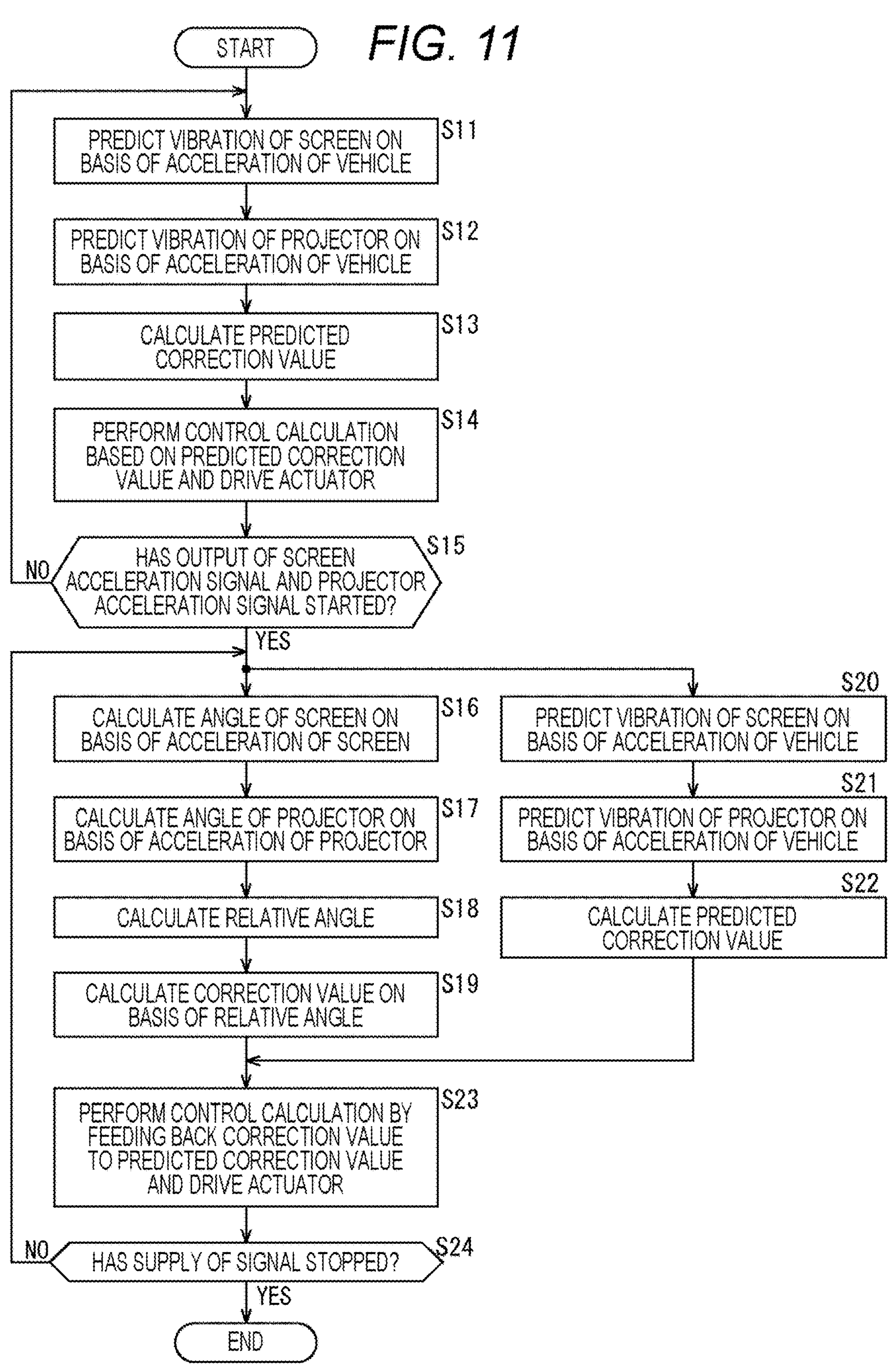
FIG. 11
START
PREDICT VIBRATION OF SCREEN ON BASIS OF ACCELERATION OF VEHICLE
S11
PREDICT VIBRATION OF PROJECTOR ON BASIS OF ACCELERATION OF VEHICLE
S12
CALCULATE PREDICTED CORRECTION VALUE
S13
PERFORM CONTROL CALCULATION BASED ON PREDICTED CORRECTION VALUE AND DRIVE ACTUATOR
S14
HAS OUTPUT OF SCREEN ACCELERATION SIGNAL AND PROJECTOR ACCELERATION SIGNAL STARTED?
S15
NO
YES
CALCULATE ANGLE OF SCREEN ON BASIS OF ACCELERATION OF SCREEN
S16
CALCULATE ANGLE OF PROJECTOR ON BASIS OF ACCELERATION OF PROJECTOR
S17
CALCULATE RELATIVE ANGLE
S18
CALCULATE CORRECTION VALUE ON BASIS OF RELATIVE ANGLE
S19
PREDICT VIBRATION OF SCREEN ON BASIS OF ACCELERATION OF VEHICLE
S20
PREDICT VIBRATION OF PROJECTOR ON BASIS OF ACCELERATION OF VEHICLE
S21
CALCULATE PREDICTED CORRECTION VALUE
S22
PERFORM CONTROL CALCULATION BY FEEDING BACK CORRECTION VALUE TO PREDICTED CORRECTION VALUE AND DRIVE ACTUATOR
S23
HAS SUPPLY OF SIGNAL STOPPED?
S24
NO
YES
END

Figure 14:
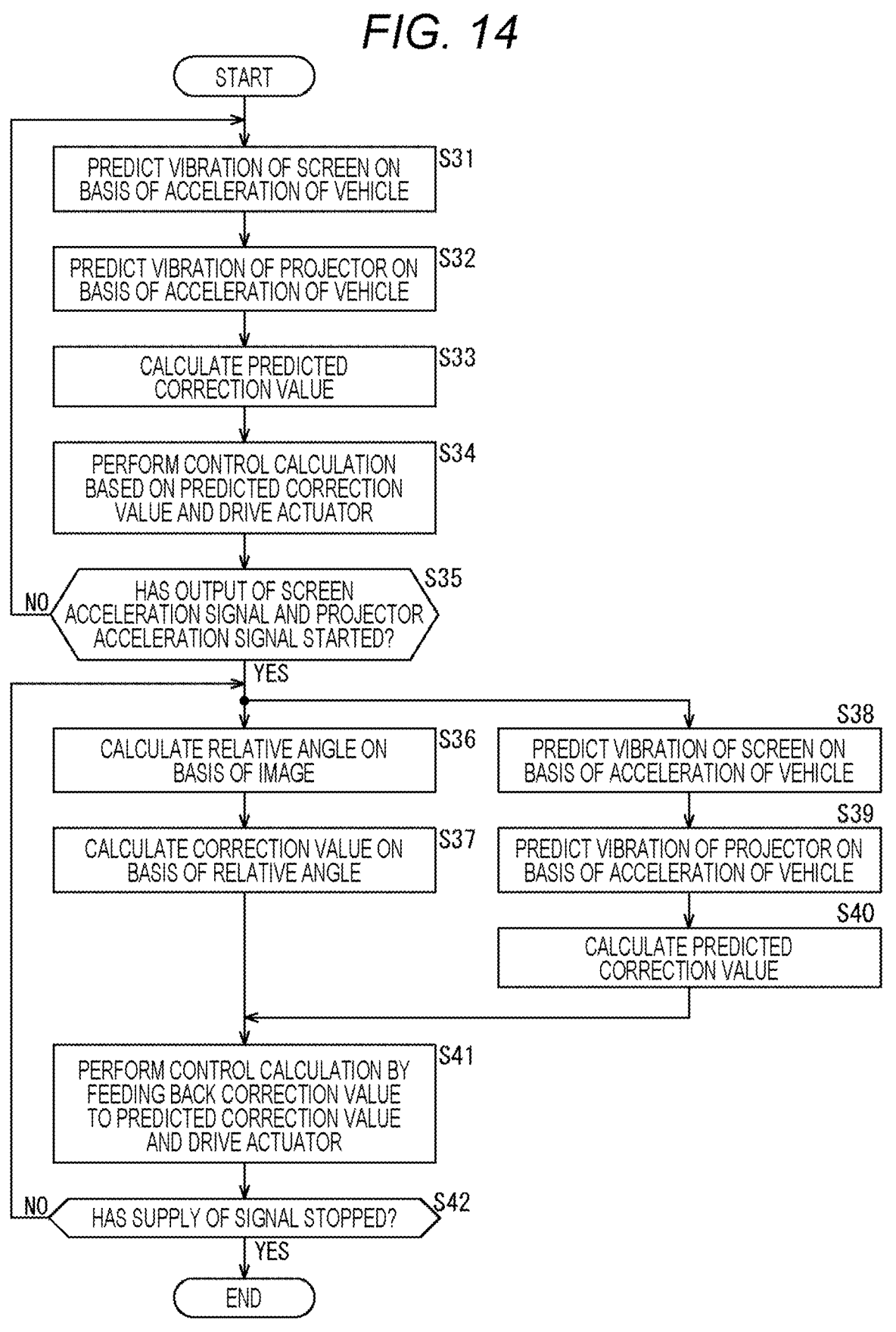

START

S31 PREDICT VIBRATION OF SCREEN ON BASIS OF ACCELERATION OF VEHICLE

S32 PREDICT VIBRATION OF PROJECTOR ON BASIS OF ACCELERATION OF VEHICLE

S33 CALCULATE PREDICTED CORRECTION VALUE

S34 PERFORM CONTROL CALCULATION BASED ON PREDICTED CORRECTION VALUE AND DRIVE ACTUATOR

S35 HAS OUTPUT OF SCREEN ACCELERATION SIGNAL AND PROJECTOR ACCELERATION SIGNAL STARTED?

NO

YES

S36 CALCULATE RELATIVE ANGLE ON BASIS OF IMAGE

S37 CALCULATE CORRECTION VALUE ON BASIS OF RELATIVE ANGLE

S38 PREDICT VIBRATION OF SCREEN ON BASIS OF ACCELERATION OF VEHICLE

S39 PREDICT VIBRATION OF PROJECTOR ON BASIS OF ACCELERATION OF VEHICLE

S40 CALCULATE PREDICTED CORRECTION VALUE

S41 PERFORM CONTROL CALCULATION BY FEEDING BACK CORRECTION VALUE TO PREDICTED CORRECTION VALUE AND DRIVE ACTUATOR

S42 HAS SUPPLY OF SIGNAL STOPPED?

NO

YES

END

FIG. 15

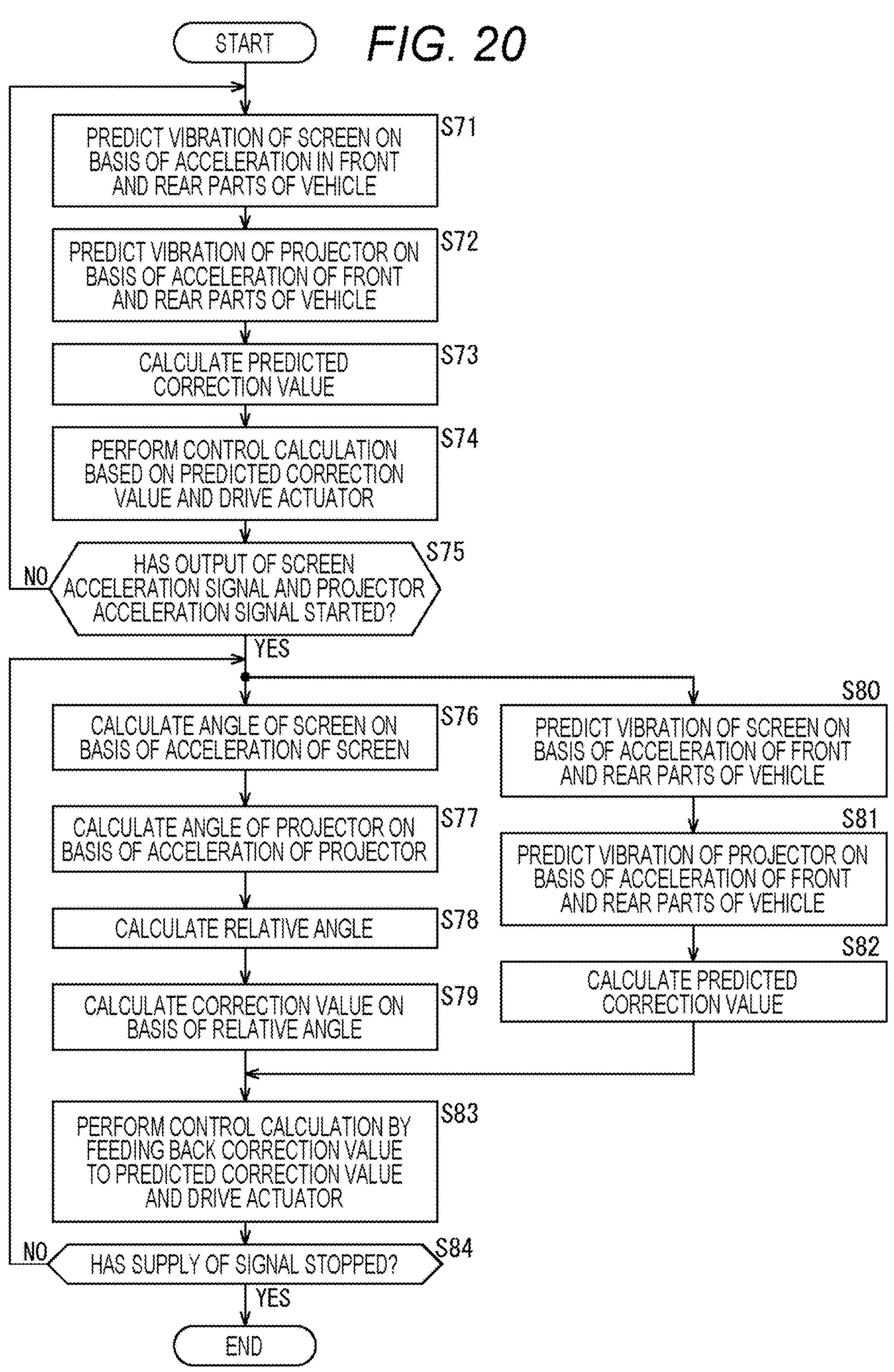

FIG. 20
START
PREDICT VIBRATION OF SCREEN ON BASIS OF ACCELERATION IN FRONT AND REAR PARTS OF VEHICLE
S71
PREDICT VIBRATION OF PROJECTOR ON BASIS OF ACCELERATION OF FRONT AND REAR PARTS OF VEHICLE
S72
CALCULATE PREDICTED CORRECTION VALUE
S73
PERFORM CONTROL CALCULATION BASED ON PREDICTED CORRECTION VALUE AND DRIVE ACTUATOR
S74
HAS OUTPUT OF SCREEN ACCELERATION SIGNAL AND PROJECTOR ACCELERATION SIGNAL STARTED?
S75
NO
YES
CALCULATE ANGLE OF SCREEN ON BASIS OF ACCELERATION OF SCREEN
S76
CALCULATE ANGLE OF PROJECTOR ON BASIS OF ACCELERATION OF PROJECTOR
S77
CALCULATE RELATIVE ANGLE
S78
CALCULATE CORRECTION VALUE ON BASIS OF RELATIVE ANGLE
S79
PREDICT VIBRATION OF SCREEN ON BASIS OF ACCELERATION OF FRONT AND REAR PARTS OF VEHICLE
S80
PREDICT VIBRATION OF PROJECTOR ON BASIS OF ACCELERATION OF FRONT AND REAR PARTS OF VEHICLE
S81
CALCULATE PREDICTED CORRECTION VALUE
S82
PERFORM CONTROL CALCULATION BY FEEDING BACK CORRECTION VALUE TO PREDICTED CORRECTION VALUE AND DRIVE ACTUATOR
S83
HAS SUPPLY OF SIGNAL STOPPED?
S84
NO
YES
END

FIG. 21

101 CPU
102 ROM
103 RAM
104 EEPROM
105
106 INPUT/OUTPUT INTERFACE
OUTSIDE

PROJECTION SYSTEM, CONTROL DEVICE, AND CONTROL METHOD

CROSS REFERENCE TO RELATED APPLICATIONS

This application is a U.S. National Phase of International Patent Application No. PCT/JP2023/036014 filed on Oct. 3, 2023, which claims priority benefit of Japanese Patent Application No. JP 2022-167530 filed in the Japan Patent Office on Oct. 19, 2022. Each of the above-referenced applications is hereby incorporated herein by reference in its entirety.

TECHNICAL FIELD

The present disclosure relates to a projection system, a control device, and a control method, and more particularly, to a projection system, a control device, and a control method capable of effectively suppressing vibration generated in an image.

BACKGROUND ART

In a case where a large-screen image is viewed in a moving space of a vehicle, it is conventionally possible to employ a structure in which a projector and a screen are attached in a vehicle interior and the projector projects the large-screen image on the screen. In this case, because the projector and the screen vibrate due to vibration caused by traveling of the vehicle and the image projected on the screen also vibrates, there is a concern that viewing of the image in the vehicle is adversely affected. It has been studied, therefore, to suppress the vibration of the image projected on the screen by detecting the vibration of the vehicle and correcting the image, and to provide an image with good visibility.

For example, Patent Document 1 discloses a projector that suppresses vibration of an image projected on a projection surface, and Patent Document 2 discloses a projection display device that achieves both operability and vibration isolation control.

CITATION LIST

Patent Document

Patent Document 1: Japanese Patent Application Laid-Open No. 2017-146520

Patent Document 2: Japanese Patent Application Laid-Open No. 2012-47850

SUMMARY OF THE INVENTION

Problems to be Solved by the Invention

It is required, however, to more effectively suppress vibration generated in an image than before.

The present disclosure has been made in view of such circumstances, and an object thereof is to effectively suppress vibration generated in an image.

Solutions to Problems

A projection system according to an aspect of the present disclosure includes a prediction calculation unit that analyzes a first acceleration signal output from a first acceleration sensor provided at a bottom of a vehicle, that predicts vibration to be generated in a screen and a projector device fixed to a ceiling of the vehicle, and that obtains a predicted correction value based on the prediction, a correction value calculation unit that obtains a correction value based on actual measurements in accordance with relative behavior of the screen and the projector device, and a control calculation unit that performs control calculation by feeding back the correction value to the predicted correction value and that obtains an amount of drive of an actuator for suppressing vibration of an image projected on the screen.

A control device according to another aspect of the present disclosure includes a prediction calculation unit that analyzes a first acceleration signal output from a first acceleration sensor provided at a bottom of a vehicle, that predicts vibration to be generated in a screen and a projector device fixed to a ceiling of the vehicle, and that obtains a predicted correction value based on the prediction, a correction value calculation unit that obtains a correction value based on actual measurements in accordance with relative behavior of the screen and the projector device, and a control calculation unit that performs control calculation by feeding back the correction value to the predicted correction value and that obtains an amount of drive of an actuator for suppressing vibration of an image projected on the screen.

A control method according to another aspect of the present disclosure is performed by a control device, the control method including analyzing a first acceleration signal output from a first acceleration sensor provided at a bottom of a vehicle, predicting vibration to be generated in a screen and a projector device fixed to a ceiling of the vehicle, and obtaining a predicted correction value based on the prediction, obtaining a correction value based on actual measurements in accordance with relative behavior of the screen and the projector device, and performing control calculation by feeding back the correction value to the predicted correction value, and obtaining an amount of drive of an actuator for suppressing vibration of an image projected on the screen.

In one aspect of the present disclosure, a first acceleration signal output from a first acceleration sensor provided at a bottom of a vehicle is analyzed, vibration to be generated in a screen and a projector device fixed to a ceiling of the vehicle is predicted, a predicted correction value based on the prediction is obtained, a correction value based on actual measurements is obtained in accordance with relative behavior of the screen and the projector device, control calculation is performed by feeding back the correction value to the predicted correction value, and an amount of drive of an actuator for suppressing vibration of an image projected on the screen is obtained.

BRIEF DESCRIPTION OF DRAWINGS

FIG. 4 is a diagram illustrating a projection damping process performed by the control device.

FIGS. 6A and 6B are diagrams illustrating visibility of a still image.

FIG. 7 is a diagram illustrating relative displacement of the screen.

FIG. 11 is a flowchart illustrating a first projection damping process.

FIG. 12 is a block diagram illustrating a configuration example of a second embodiment of the projection system to which the present technology is applied.

FIG. 14 is a flowchart illustrating a second projection damping process.

FIG. 15 is a block diagram illustrating a configuration example of a third embodiment of the projection system to which the present technology is applied.

FIG. 20 is a flowchart illustrating a fourth projection damping process.

FIG. 21 is a block diagram illustrating a configuration example of an embodiment of a computer to which the present technology is applied.

MODE FOR CARRYING OUT THE INVENTION

Specific embodiments to which the present technology is applied will be described in detail hereinafter with reference to the drawings.

First Configuration Example of Projection System

Figure 1:
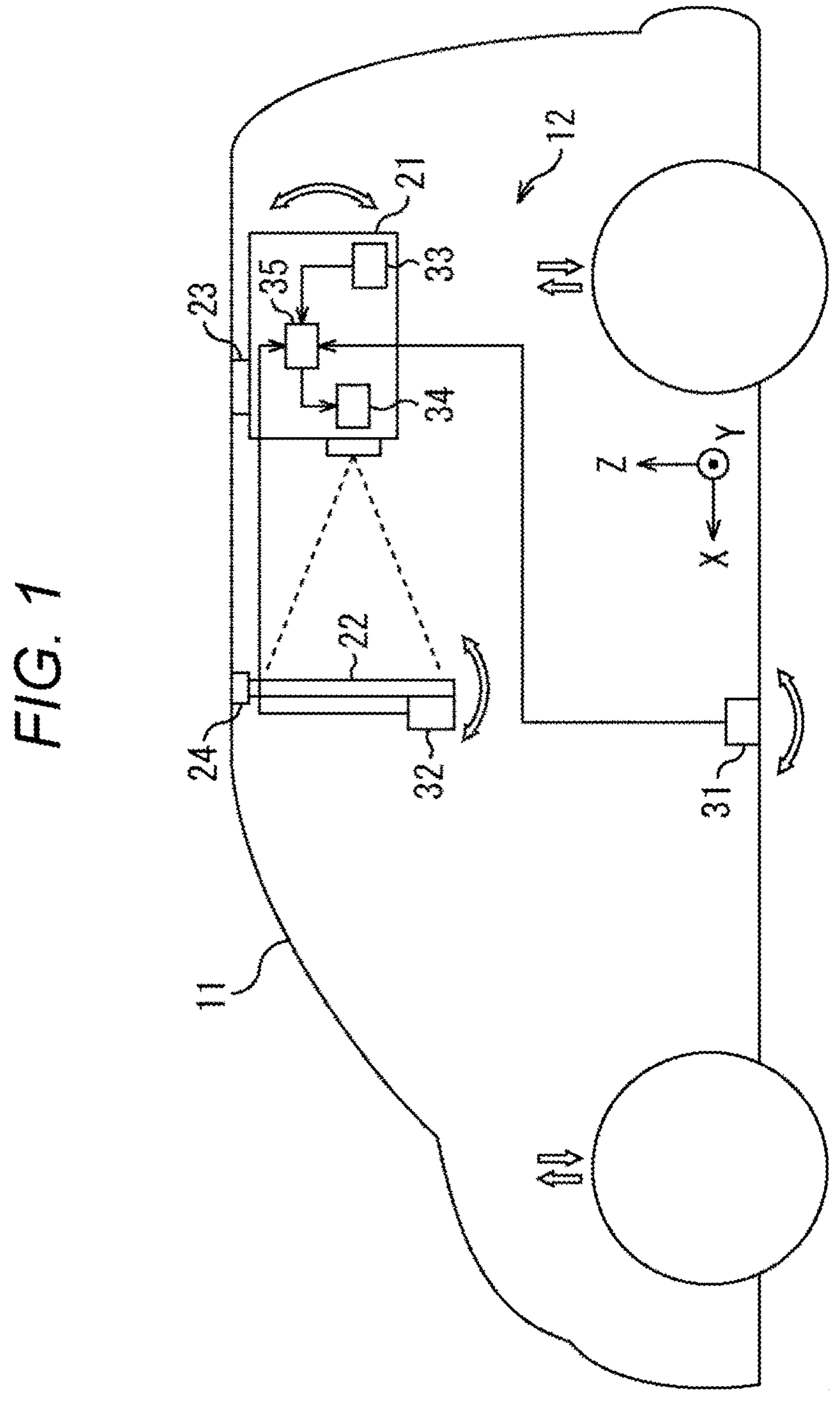
FIG. 1 is a block diagram illustrating a configuration example of a first embodiment of a projection system to which the present technology is applied.

FIG. 1 is a diagram illustrating a configuration example of a first embodiment of a projection system to which the present technology is applied.

As illustrated in FIG. 1, a projection system 12 mounted on a vehicle 11 includes a projector device 21 and a screen 22. The projector device 21 is fixed to a ceiling of the vehicle 11 by a fixing member 23, and the screen 22 is fixed to the ceiling of the vehicle 11 by a fixing member 24. The projection system 12 can then suppress vibration generated in an image projected by the projector device 21 on the screen 22 during traveling of the vehicle 11 to such an extent that an occupant of the vehicle 11 is not bothered by the vibration.

Furthermore, the projection system 12 includes acceleration sensors 31 to 33, a projection device 34 with a correction function, and a control device 35.

The acceleration sensor 31 is attached to a bottom of the vehicle 11, detects acceleration of vibration generated in the vehicle 11 as the vehicle 11 travels, and supplies a vehicle acceleration signal, which is a signal indicating magnitude of the acceleration, to the control device 35. For example, the acceleration sensor 31 is preferably attached to a chassis frame to which axles of front and rear tires of the vehicle 11 are fixed at a middle position between the front and rear tires.

The acceleration sensor 32 is attached to the vicinity of an end of the screen 22, detects acceleration of vibration generated in the screen 22 as the vehicle 11 travels, and supplies a screen acceleration signal, which is a signal indicating magnitude of the acceleration, to the control device 35.

The acceleration sensor 33 can be built in the projector device 21, detects acceleration of vibration generated in the projector device 21 as the vehicle 11 travels, and supplies a projector acceleration signal, which is a signal indicating magnitude of the acceleration, to the control device 35.

The projection device 34 with the correction function has a correction function of correcting an image projected on the screen 22 by, for example, driving a mirror 54 with an actuator 55 in accordance with a drive signal supplied from the control device 35 as described later with reference to FIG. 8.

The control device 35 outputs a drive signal for instructing the actuator 55 (FIG. 8) of the projection device 34 with the correction function to drive in such a way as to suppress vibration generated in an image projected on the screen 22 on the basis of the vehicle acceleration signal supplied from the acceleration sensor 31, the screen acceleration signal supplied from the acceleration sensor 32, and the projector acceleration signal supplied from the acceleration sensor 33. Note that a configuration in which the control device 35 is built in the projector device 21 is shown in the illustrated example, but the control device 35 may be provided independently, instead.

For example, in a case where the vehicle 11 travels for movement, the tires of the vehicle 11 vibrate in a vertical direction due to an effect of unevenness of a road surface as indicated by hollow arrows, and the vibration is transmitted to the entire vehicle 11, thereby causing the projector device 21 and the screen 22 to vibrate.

Figures 2A, 2B:
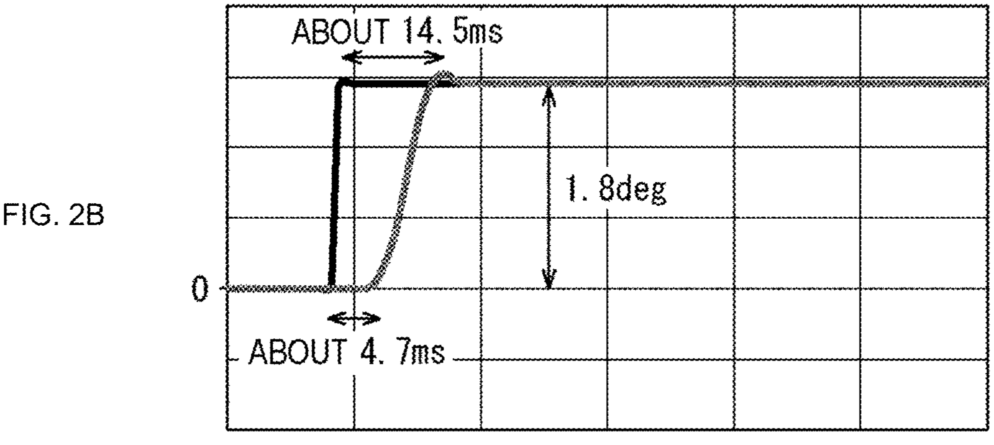
FIGS. 2A and 2B are diagrams illustrating behavior of a projector device and a screen.

At this time, the projector device 21 vibrates with the fixing member 23 as a fulcrum and the screen 22 vibrates with the fixing member 24 as a fulcrum, that is, rotation in a pitch direction is dominant to rotation in a roll direction and a yaw direction. In addition, the projector device 21 and the screen 22 vibrate differently. For example, FIG. 2A illustrates an example of a result of an analysis obtained by analyzing relative displacement between the projector device 21 and the screen 22, a rotation angle of the projector device 21, and a rotation angle of the screen 22, which are caused by the vibration of the vehicle 11.

By the way, with respect to vibration transmission in the vehicle 11, vibration is transmitted from the tires serving as vibration input points of unevenness of a road surface to the vehicle 11. Since the vibration reaches positions far from the vibration input points with delays, the projector device 21 and the screen 22 vibrate with delays from a time of input of the vibration to the tires of the vehicle 11.

Here, a configuration for correcting an image projected on the screen 22 using only the acceleration sensor 33 provided for the projector device 21 and the acceleration sensor 32 provided for the screen 22 will be described.

In a case where the projector device 21 and the screen 22 vibrate, for example, it is necessary to prevent a relative relationship between the projector device 21 and the screen 22 from changing in order to prevent an image projected on the screen 22 from being affected by the vibration. As described above, since the projector device 21 and the screen 22 vibrate differently, it is necessary to detect the vibration of not either the projector device 21 or the screen 22 but both the projector device 21 and the screen 22. Relative vibration of the projector device 21 and the screen 22 is therefore detected on the basis of outputs of the acceleration sensor 33 and the acceleration sensor 32.

There is, however, a delay illustrated in FIG. 2B until the actuator 55 of the projection device 34 with the correction function is driven in order to correct an image and an operation angle of the mirror 54 (FIG. 8) becomes a command angle according to the drive after the relative vibration of the projector device 21 and the screen 22 is detected. In a period corresponding to such a delay, therefore, vibration occurs in the image projected on the screen 22. For this reason, in a configuration in which only the acceleration sensor 33 provided for the projector device 21 and the acceleration sensor 32 provided for the screen 22 are used, it is difficult to suppress vibration of an image projected on the screen 22 to such an extent that an occupant of the vehicle 11 is not bothered by the vibration.

The control device 35, therefore, is configured to correct an image projected on the screen 22 using the acceleration sensor 31 provided at the bottom of the vehicle 11 in addition to the acceleration sensor 33 provided for the projector device 21 and the acceleration sensor 32 provided for the screen 22.

Figure 3:
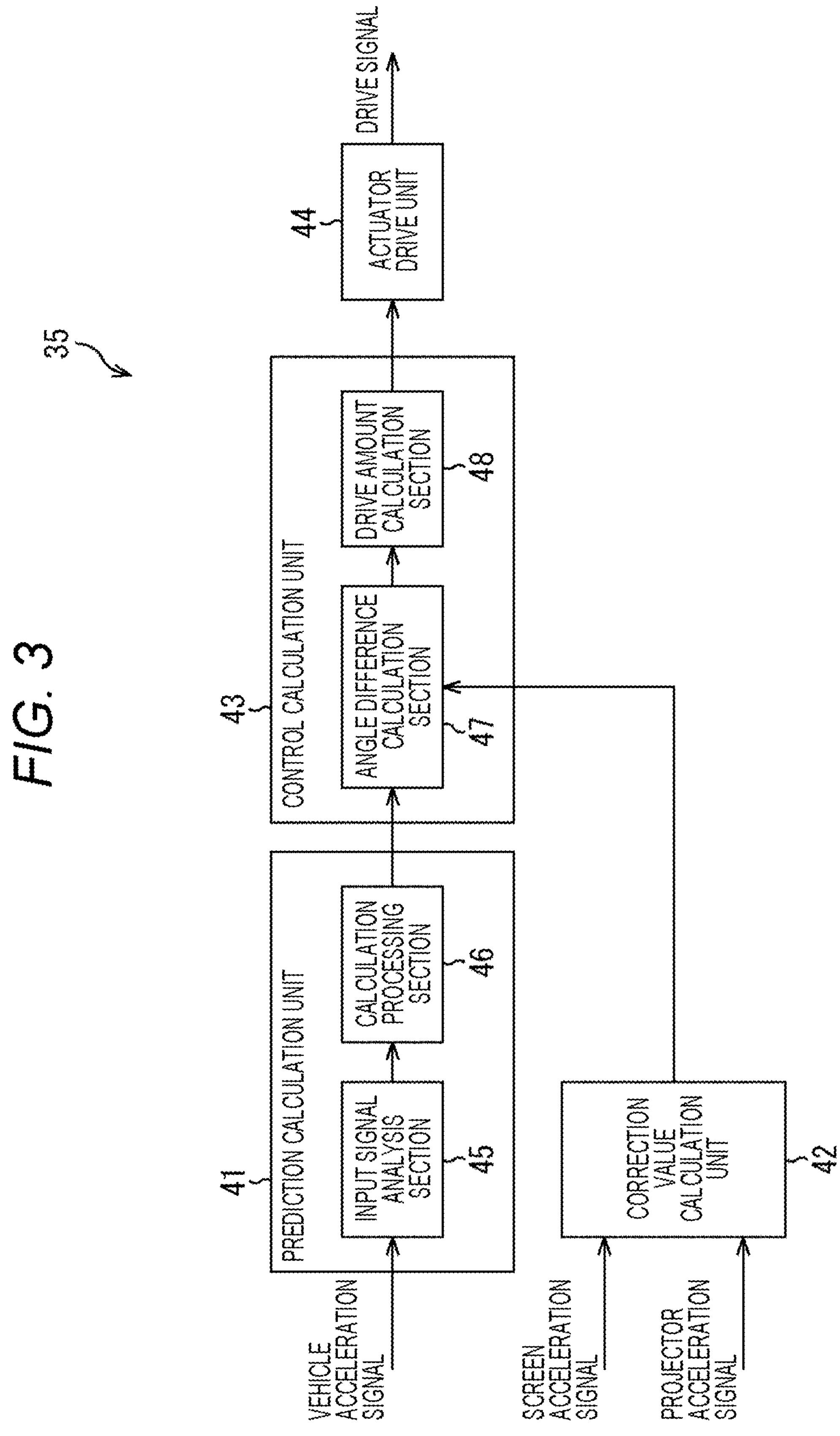
FIG. 3 is a diagram illustrating a first configuration example of a control device.

FIG. 3 is a block diagram illustrating a first configuration example of the control device 35.

As illustrated in FIG. 3, the control device 35 includes a prediction calculation unit 41, a correction value calculation unit 42, a control calculation unit 43, and an actuator drive unit 44.

The prediction calculation unit 41 analyzes the vehicle acceleration signal supplied from the acceleration sensor 31, predicts vibration generated in the screen 22 and the projector device 21, and performs calculation processing for obtaining predicted angles of the screen 22 and the projector device 21 according to the predicted vibration. The prediction calculation unit 41 then obtains a predicted correction value based on the prediction and supplies the predicted correction value to the control calculation unit 43 in order to correct an image projected on the screen 22 in such a way as to suppress vibration of the image in accordance with relative behavior of the predicted angle of the screen 22 and the predicted angle of the projector device 21.

For example, the prediction calculation unit 41 may include an input signal analysis section 45 and a calculation processing section 46. The input signal analysis section 45 can analyze frequency and amplitude of vibration of the vehicle 11 indicated by the vehicle acceleration signal and determine on/off of control in accordance with a result of the analysis. The calculation processing section 46 can perform calculation processing for obtaining a predicted correction value by obtaining a predicted angle of the screen 22 and a predicted angle of the projector device 21 on the basis of prediction of vibration to be transmitted through the vehicle 11.

The correction value calculation unit 42 calculates an angle (actual measurement) of the screen 22 according to vibration generated in the screen 22 in accordance with the screen acceleration signal supplied from the acceleration sensor 32. Furthermore, the correction value calculation unit 42 obtains an angle (actual measurement) of the projector device 21 according to vibration generated in the projector device 21 in accordance with the projector acceleration signal supplied from the acceleration sensor 33. The correction value calculation unit 42 then obtains a correction value based on the actual measurements and supplies the correction value to the control calculation unit 43 in order to correct an image projected on the screen 22 in such a way as to suppress vibration of the image in accordance with relative behavior of the angle of the screen 22 and the angle of the projector device 21.

When the predicted correction value is supplied from the prediction calculation unit 41, the control calculation unit 43 performs control calculation based on the predicted correction value, obtains an amount of drive of the actuator 55 for suppressing the vibration of the image projected on the screen 22, and supplies the amount of drive to the actuator drive unit 44. Thereafter, when the correction value is supplied from the correction value calculation unit 42, the control calculation unit 43 performs control calculation by feeding back the correction value to the predicted correction value, obtains an amount of drive of the actuator 55 for suppressing the vibration of the image projected on the screen 22, and supplies the amount of drive to the actuator drive unit 44.

For example, the control calculation unit 43 may include an angle difference calculation section 47 and a drive amount calculation section 48. The angle difference calculation section 47 can calculate a difference between a predicted correction value obtained by the prediction calculation unit 41 and a correction value obtained by the correction value calculation unit 42 and feed back the correction value to the predicted correction value. The drive amount calculation section 48 can calculate an amount of drive of the actuator 55.

The actuator drive unit 44 supplies a drive signal according to an amount of drive supplied from the control calculation unit 43 to the actuator 55 to drive the actuator 55.

Figure 4:
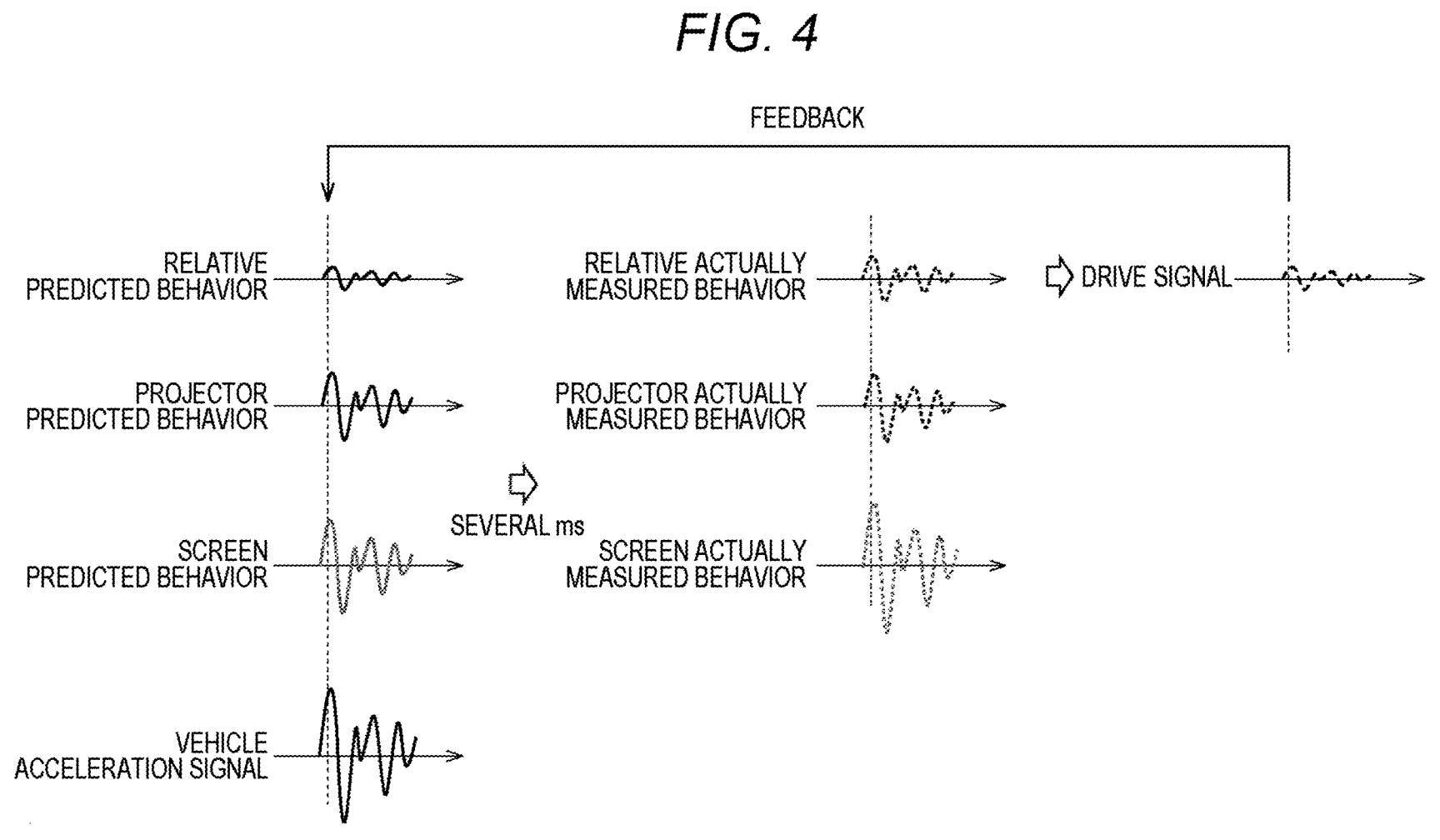

The control device 35 configured as described above can perform, for example, feedback control illustrated in FIG. 4.

As illustrated in a left side of FIG. 4, the control device 35 obtains a predicted behavior of the screen 22 and a predicted behavior of the projector device 21 in advance on the basis of the vehicle acceleration signal. Correction control for canceling relative displacement between the screen 22 and projector device 21 is then started on the basis of the relative predicted behavior.

Since a delay of several milliseconds actually occurs until vibration of a lower portion of the vehicle 11 is transmitted to the screen 22 and the projector device 21, for example, it is possible to avoid occurrence of an operation delay by performing an operation using prediction. The control device 35 can then output a drive signal to the actuator 55 using the output vehicle acceleration signal as a trigger. As a result, it is possible to reduce a delay in a start of the operation of the actuator 55.

After a lapse of several milliseconds, actual vibration is then transmitted to the screen 22 and the projector device 21, and the acceleration sensor 32 and the acceleration sensor 33 detect the vibration. As a result, as illustrated in the center of FIG. 4, actually measured behavior of the screen 22 and actually measured behavior of the projector device 21 are obtained, and their relative actually measured behavior is obtained.

As a result, a difference between the relative predicted behavior and the relative actually measured behavior can be calculated, and a result of the calculation can be fed back to correction motion that has started on the basis of the prediction. Consequently, as illustrated in a right side of FIG. 4, the actuator 55 can be subjected to drive control by the drive signal for achieving correct correction behavior through correction.

The projection system 12, therefore, can reduce a delay in a start of movement of the actuator 55 and achieve high-speed control by detecting an input vibration in advance using time from the input of the vibration to transmission of the vibration in the vehicle 11 in consideration of a transmission delay of the vibration and a correction start delay in the vehicle 11. That is, the projection system 12 can effectively suppress vibration generated in an image projected on the screen 22 to such an extent that an occupant of the vehicle 11 is not bothered by the vibration by disposing the acceleration sensor 31 at the bottom of the vehicle 11, where vibration is immediately input, and detecting in advance vibration to be generated in the screen 22 and the projector device 21.

Vibration Control in Consideration of Human Visibility

Vibration control in consideration of human visibility will be described with reference to FIGS. 5A, 5B, 6A, 6B, 7, 8, and 9.

For example, in a case where correction control is actually performed, it is physically impossible to completely eliminate vibration generated in an image projected on the screen 22, and it is preferable to perform vibration control in consideration of how much vibration of the image affects human visibility. In order to provide an image with good visibility, therefore, an experiment for verifying visibility given to a person in a case where frequency and amplitude of vibration of an image were changed was performed, and results illustrated in FIGS. 5A, 5B, 6A, and 6B could be obtained.

Figure 5A:
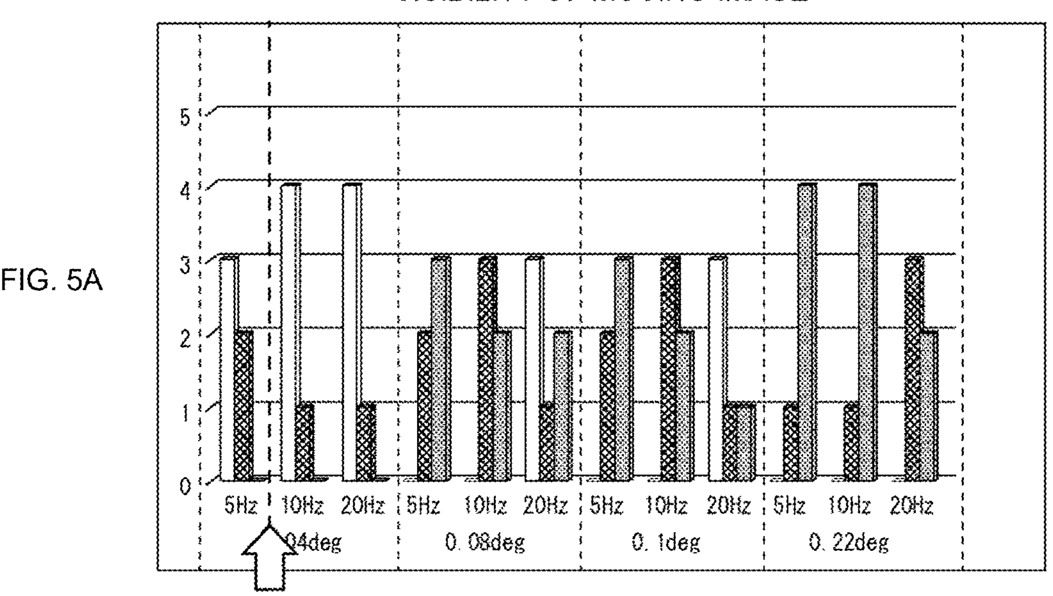
FIGS. 5A and 5B are diagrams illustrating visibility of a moving image.
Figure 5B:
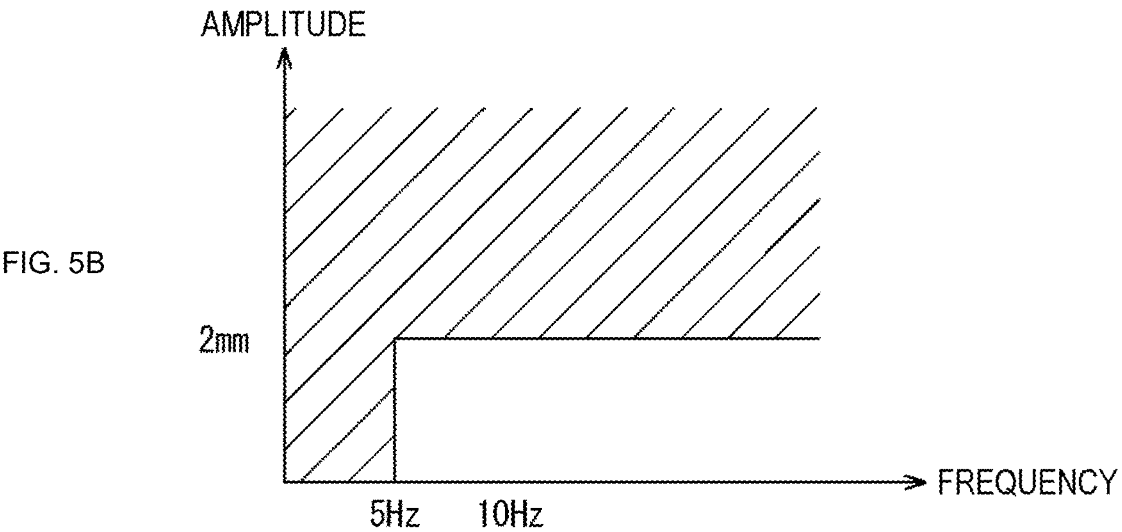

FIGS. 5A and 5B are diagrams illustrating visibility of a moving image.

As illustrated in FIG. 5A, as a result of examination of the visibility of a moving image for frequency for each of amplitude variations, it has been verified that there are many people who feel that it is not acceptable to view the moving image in a case where the amplitude variation is 0.04 deg or more and the frequency is 5 Hz or more. As illustrated in FIG. 5B, therefore, the moving image needs to be corrected in a region where the amplitude variation is 2 mm or more and a region where the frequency is 5 Hz or less (a hatched region in FIG. 5B).

FIGS. 6A and 6B are diagrams illustrating visibility of a still image.

As illustrated in FIG. 6A, as a result of examination of the visibility of a still image for frequency for each of amplitude variations, it has been verified that there are many people who feel that it is not acceptable to view the still image in a case where the amplitude variation is 0.04 deg or more and the frequency is 10 Hz or more. As illustrated in FIG. 6B, therefore, the still image needs to be corrected in a region where the amplitude variation is 2 mm or more and a region where the frequency is 10 Hz or less (a hatched region in FIG. 6B).

As described above, a result was obtained that as the amplitude (vibration width) increased, the visibility decreased, and at the vibration frequency of 5 to 20 Hz, the visibility decreased as the frequency became lower. Furthermore, a result was obtained that the visibility was less likely to be affected at a time of viewing a moving image than at a time of viewing a still image.

Note that, in a case where control is performed in consideration of visibility, the visibility is not affected at a time of vibration input in a region where the visibility does not become unacceptable, and therefore it is also possible not to perform the control. For example, since the vibration input changes in time series, it is necessary to perform determination processing each time an input signal changes. The input signal analysis section 45 in FIG. 1 performs such on/off determination processing of the control. That is, the input signal analysis section 45 can analyze frequency and amplitude of vibration of the vehicle 11 indicated by the vehicle acceleration signal and determine on/off of the control in accordance with a result of the analysis.

Relative displacement of the screen 22 will be described with reference to FIG. 7.

Figure 7:
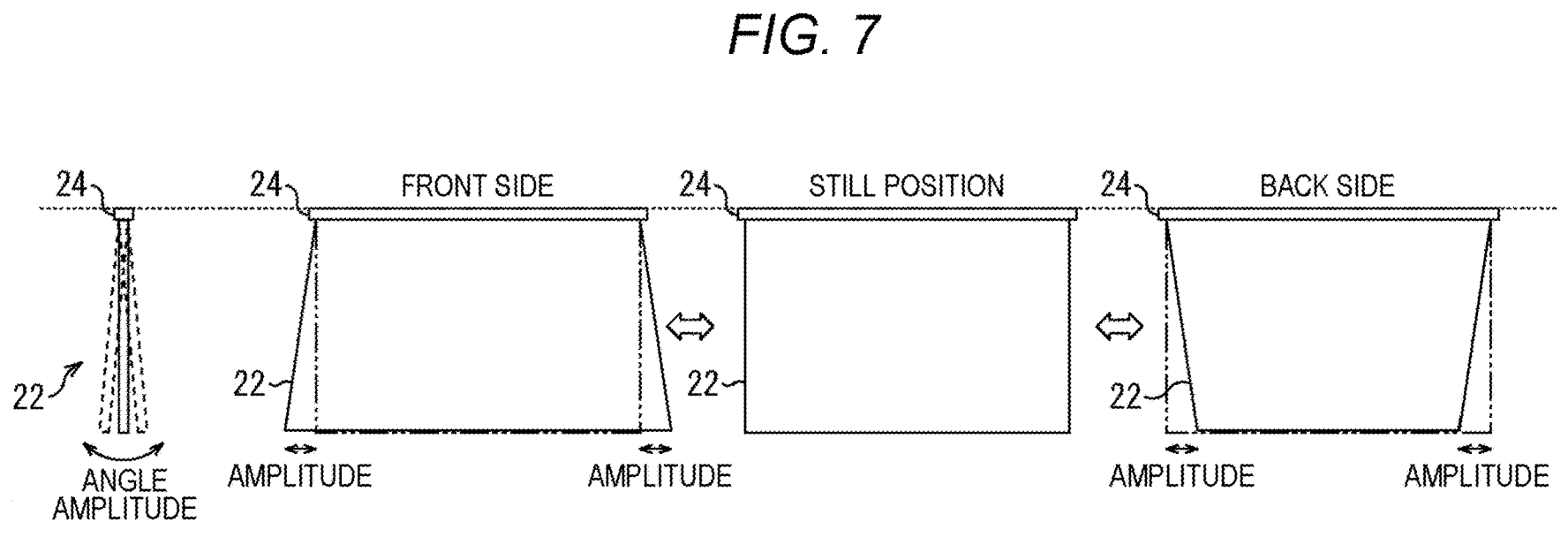

For example, in rotational displacement of the projector device 21 and the screen 22, an image projected on the screen 22 is displaced as illustrated in FIG. 7. Note that, since the projector device 21 and the screen 22 are relatively displaced, FIG. 7 illustrates rotation of the screen 22 in a case where the projector device 21 is fixed.

The screen 22 is fixed to the ceiling of the vehicle 11 by the fixing member 24, so that angular amplitude of the screen 22 behaves such that amplitude of a lower side of the screen 22 varies in length. Furthermore, dominant vibration amplitude of the image in a case where the screen 22 is rotationally displaced is variation in length of sides of a trapezoid, and in a case where this difference increases, the visibility decreases. The frequency then increases as this switching motion becomes faster.

The projection device 34 with the correction function, therefore, corrects the relative displacement of the screen 22.

A configuration example of the projection device 34 with the correction function will be described with reference to FIG. 8.

Figure 8:
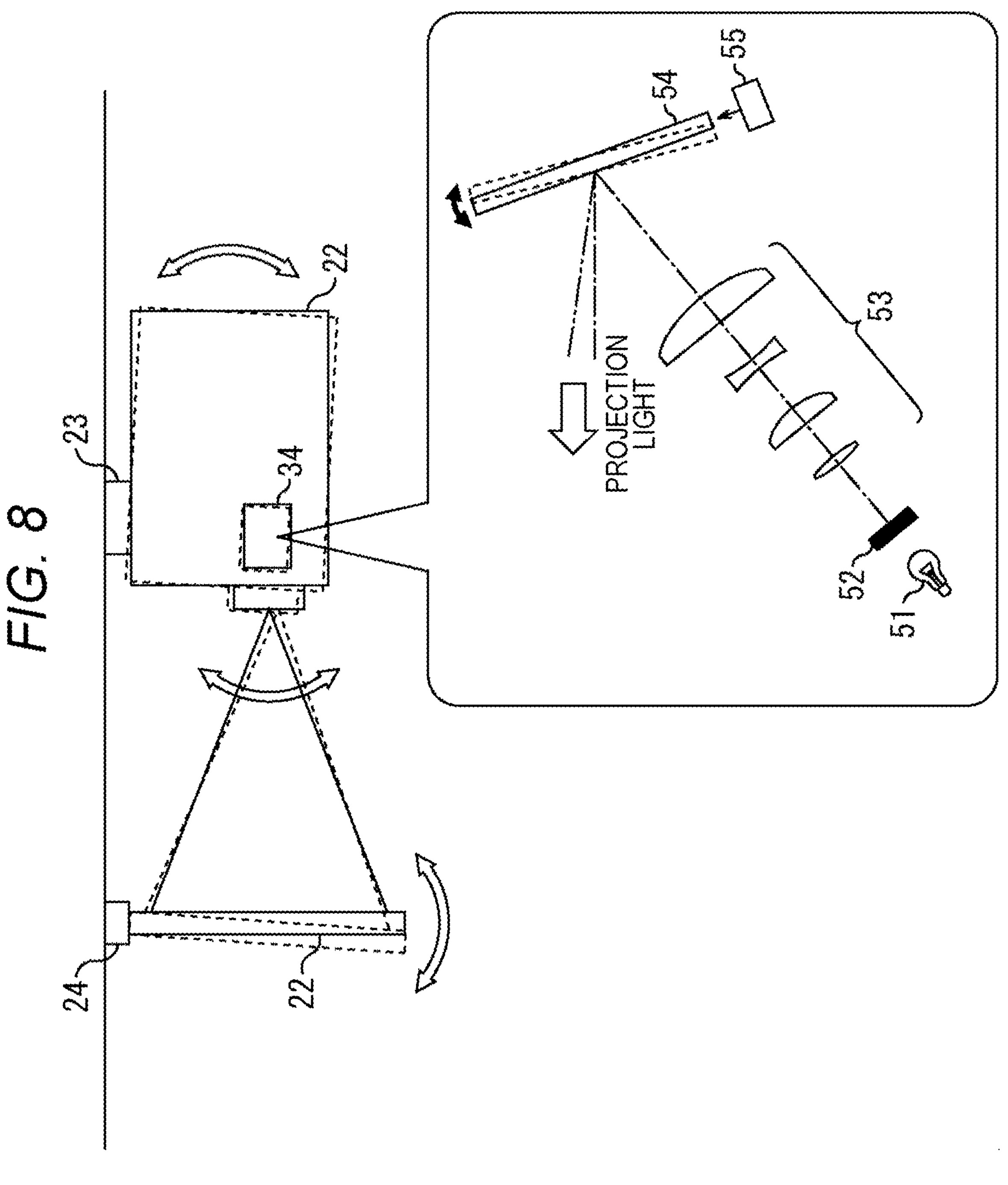
FIG. 8 is a diagram illustrating a configuration example of a projection device with a correction function.

As illustrated in FIG. 8, the projection device 34 with the correction function includes a light source 51, a transmissive liquid crystal panel 52, an optical system 53, a mirror 54, and an actuator 55. For example, light output from the light source 51 is condensed such that an image transmitted through the transmissive liquid crystal panel 52 is formed on the screen 22 by the optical system 53, reflected by the mirror 54, and projected on the screen 22.

As indicated by broken lines, in a case where vibration is then generated in the projector device 21 and the screen 22, the actuator 55 drives the mirror 54 in such a way as to cancel a change in a relative angle between the projector device 21 and the screen 22, thereby correcting distortion due to vibration (pitch rotation) of the image projected on the screen 22.

Note that the projection device 34 with the correction function may use a reflective panel based on digital light processing (DLP) or liquid crystal on silicon (LCOS) instead of the transmissive liquid crystal panel 52.

Figure 9:
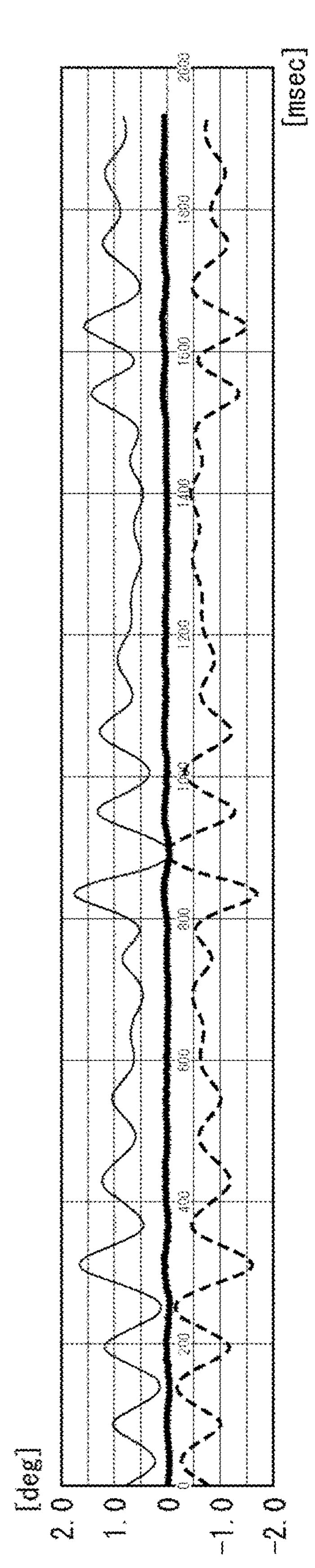
FIG. 9 is a diagram illustrating an example of results of verification.

FIG. 9 illustrates an example of results of verification of an image corrected by the projection device 34 with the correction function.

FIG. 9 illustrates angle changes based on the projector acceleration signal output from the acceleration sensor 33 of the projector device 21, angle changes of the mirror 54 driven by the actuator 55, and difference values between these angle changes. Furthermore, an upper side of FIG. 9 illustrates a result of control performed without using the output of the acceleration sensor 31 attached to the bottom of the vehicle 11, and a lower side of FIG. 9 illustrates a result of control performed using the output of the acceleration sensor 31 attached to the bottom of the vehicle 11.

As illustrated in the upper side of FIG. 9, in a case where the output of the acceleration sensor 31 is not used, vibration whose amplitude has not been sufficiently corrected appears in the difference values. As illustrated in the lower side of FIG. 9, on the other hand, in a case where the output of the acceleration sensor 31 is used, the difference values indicate successful amplitude correction, and an effect of suppressing changes in the relative displacement can be produced.

As described above, by using the output of the acceleration sensor 31, it is possible to verify an effect of detecting in advance vibration to be generated in the projector device 21 and the screen 22.

Configuration Examples of Projection Device with Correction Function

Various configuration examples of the projection device 34 with the correction function will be described with reference to FIGS. 10A, 10B, 10C, and 10D.

Figures 10A, 10B, 10C, 10D:
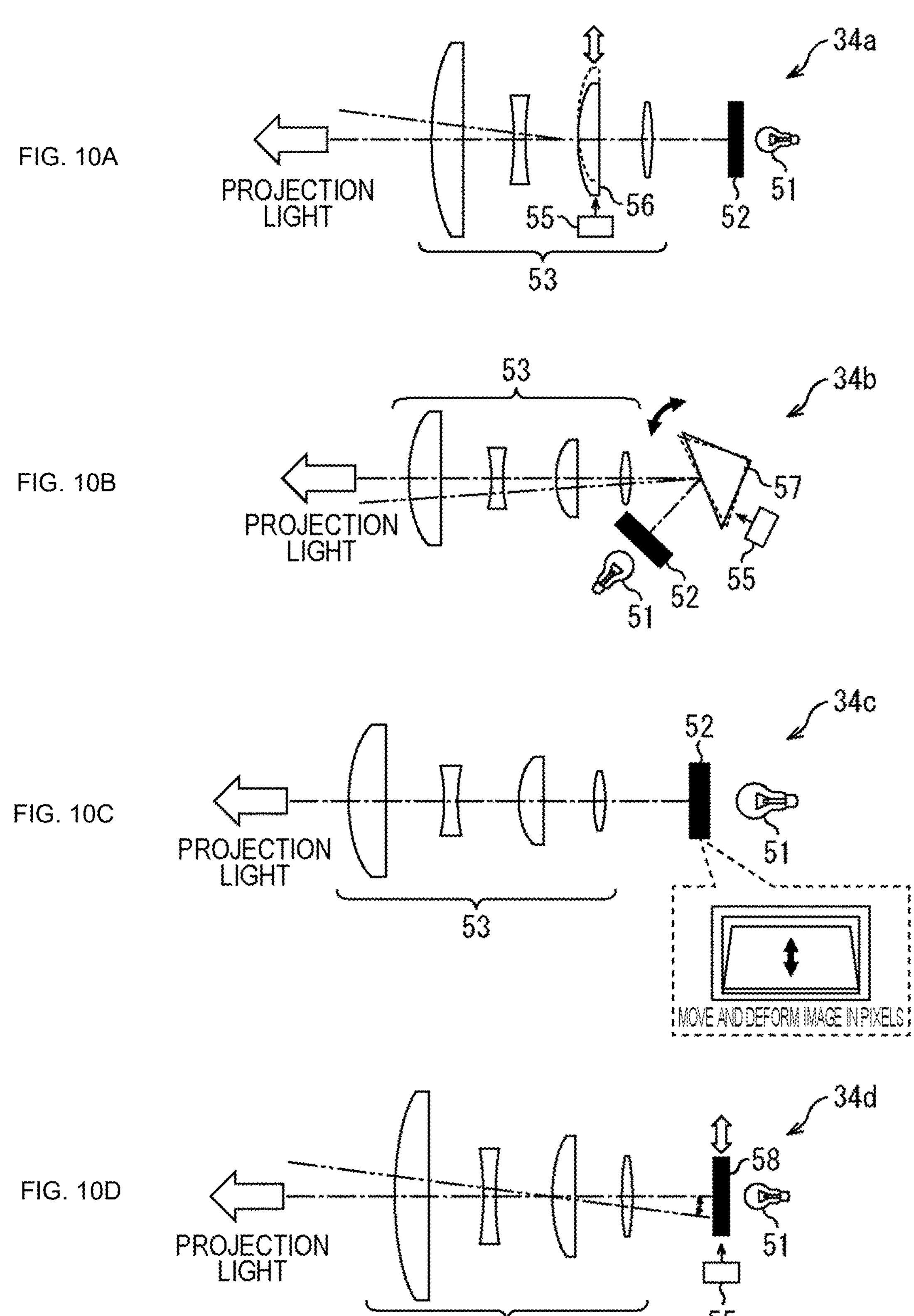
FIGS. 10A, 10B, 10C, and 10D are diagrams illustrating various configuration examples of the projection device with the correction function.

A projection device 34*a* with a correction function illustrated in FIG. 10A includes a light source 51, a transmissive liquid crystal panel 52, an optical system 53, and an actuator 55, and a control lens 56 is provided as one of a plurality of lenses included in the optical system 53. In the projection device 34*a* with the correction function, the actuator 55 then drives and shifts the control lens 56 to correct an image projected on the screen 22.

A projection device 34*b* with a correction function illustrated in FIG. 10B includes a light source 51, a transmissive liquid crystal panel 52, an optical system 53, an actuator 55, and a prism mirror 57. In the projection device 34*b* with the correction function, an image projected on the screen 22 can then be corrected by rotationally driving the prism mirror 57 using the actuator 55.

A projection device 34*c* with a correction function illustrated in FIG. 10C includes a light source 51, a transmissive liquid crystal panel 52, and an optical system 53. In the projection device 34*c* with the correction function, an image projected on the screen 22 can then be corrected by moving and deforming the image in pixels of the transmissive liquid crystal panel 52.

A projection device 34*d* with a correction function illustrated in FIG. 10D includes a light source 51, an optical system 53, an actuator 55, and a shift transmissive liquid crystal panel 58. In the projection device 34*d* with the correction function, an image projected on the screen 22 can be corrected by driving and shifting the shift transmissive liquid crystal panel 58 using the actuator 55.

Note that the projection device 34 with the correction function may employ a configuration other than the configuration examples illustrated in FIGS. 8, 10A, 10B 10C, and 10D, a configuration obtained by combining these configuration examples, or the like.

Processing Example of Projection Damping Process

FIG. 11 is a flowchart illustrating a projection damping process for suppressing vibration of an image projected on the screen 22. For example, in a case where the projection system 12 is activated and the acceleration sensor 31 outputs the vehicle acceleration signal, the process starts.

In step S11, the prediction calculation unit 41 performs calculation processing for analyzing the vehicle acceleration signal supplied from the acceleration sensor 31, predicting vibration to be generated in the screen 22, and obtaining a predicted angle of the screen 22 in accordance with the predicted vibration.

In step S12, the prediction calculation unit 41 performs calculation processing for analyzing the vehicle acceleration signal supplied from the acceleration sensor 31, predicting vibration to be generated in the projector device 21, and obtaining a predicted angle of the projector device 21 in accordance with the predicted vibration.

In step S13, the prediction calculation unit 41 performs calculation for obtaining a predicted correction value based on the prediction in order to correct an image in such a way as to suppress vibration of an image projected on the screen 22 in accordance with relative behavior between the predicted angle of the screen 22 obtained in step S11 and the predicted angle of the projector device 21 obtained in step S12. The prediction calculation unit 41 then supplies the predicted correction value to the control calculation unit 43.

In step S14, the control calculation unit 43 performs control calculation based on the predicted correction value supplied from the prediction calculation unit 41 in step S13, obtains an amount of drive of the actuator 55 for suppressing the vibration of the image projected on the screen 22, and supplies the amount of drive to the actuator drive unit 44. The actuator drive unit 44 then supplies a drive signal according to the amount of drive supplied from the control calculation unit 43 to the actuator 55 to drive the actuator 55.

In step S15, the correction value calculation unit 42 determines whether or not output of the screen acceleration signal supplied from the acceleration sensor 32 and the projector acceleration signal supplied from the acceleration sensor 33 has started. If it is determined in step S15 that the output of the screen acceleration signal and the projector acceleration signal has not started, the process returns to step S11, and similar processing is repeatedly performed thereafter.

If it is determined in step S15 that the output of the screen acceleration signal and the projector acceleration signal has started, on the other hand, the process proceeds to steps S16 and S20.

In step S16, the correction value calculation unit 42 performs calculation for obtaining an angle (actual measurement) of the screen 22 according to vibration generated in the screen 22 in accordance with the screen acceleration signal supplied from the acceleration sensor 32.

In step S17, the correction value calculation unit 42 performs calculation for obtaining an angle (actual measurement) of the projector device 21 according to vibration generated in the projector device 21 in accordance with the projector acceleration signal supplied from the acceleration sensor 33.

In step S18, the correction value calculation unit 42 performs calculation for obtaining a relative angle between an angle of the screen 22 obtained in step S16 and an angle of the projector device 21 obtained in step S17.

In step S19, the correction value calculation unit 42 performs, on the basis of the relative angle obtained in step S18, calculation for obtaining a correction value based on the actual measurements in order to correct the image in such a way as to suppress the vibration of the image projected on the screen 22. The correction value calculation unit 42 then supplies the correction value to the control calculation unit 43.

Furthermore, in steps S20 to S22, processing similar to steps S11 to S22 is performed in parallel with steps S16 to S19.

In step S23, the control calculation unit 43 performs control calculation by feeding back the correction value supplied from the correction value calculation unit 42 in step S19 to the predicted correction value supplied from the prediction calculation unit 41 in step S22, obtains an amount of drive of the actuator 55 for suppressing the vibration of the image projected on the screen 22, and supplies the amount of drive to the actuator drive unit 44. The actuator drive unit 44 then supplies a drive signal according to the amount of drive supplied from the control calculation unit 43 to the actuator 55 to drive the actuator 55.

In step S24, the prediction calculation unit 41 and the correction value calculation unit 42 determine whether or not the supply of the vehicle acceleration signal, the screen acceleration signal, and the projector acceleration signal has stopped. If it is determined in step S24 that the supply of the vehicle acceleration signal, the screen acceleration signal, and the projector acceleration signal has not stopped, the process returns to steps S16 and S20, and similar processing is repeatedly performed thereafter.

If it is determined in step S24 that the supply of the vehicle acceleration signal, the screen acceleration signal, and the projector acceleration signal has stopped, on the other hand, the projection damping processing is terminated.

By performing the projection damping process described above, the projection system 12 can effectively suppress the vibration generated in the image projected on the screen 22 to such an extent that an occupant of the vehicle 11 is not bothered by the vibration.

Second Configuration Example of Projection System

Figure 12:
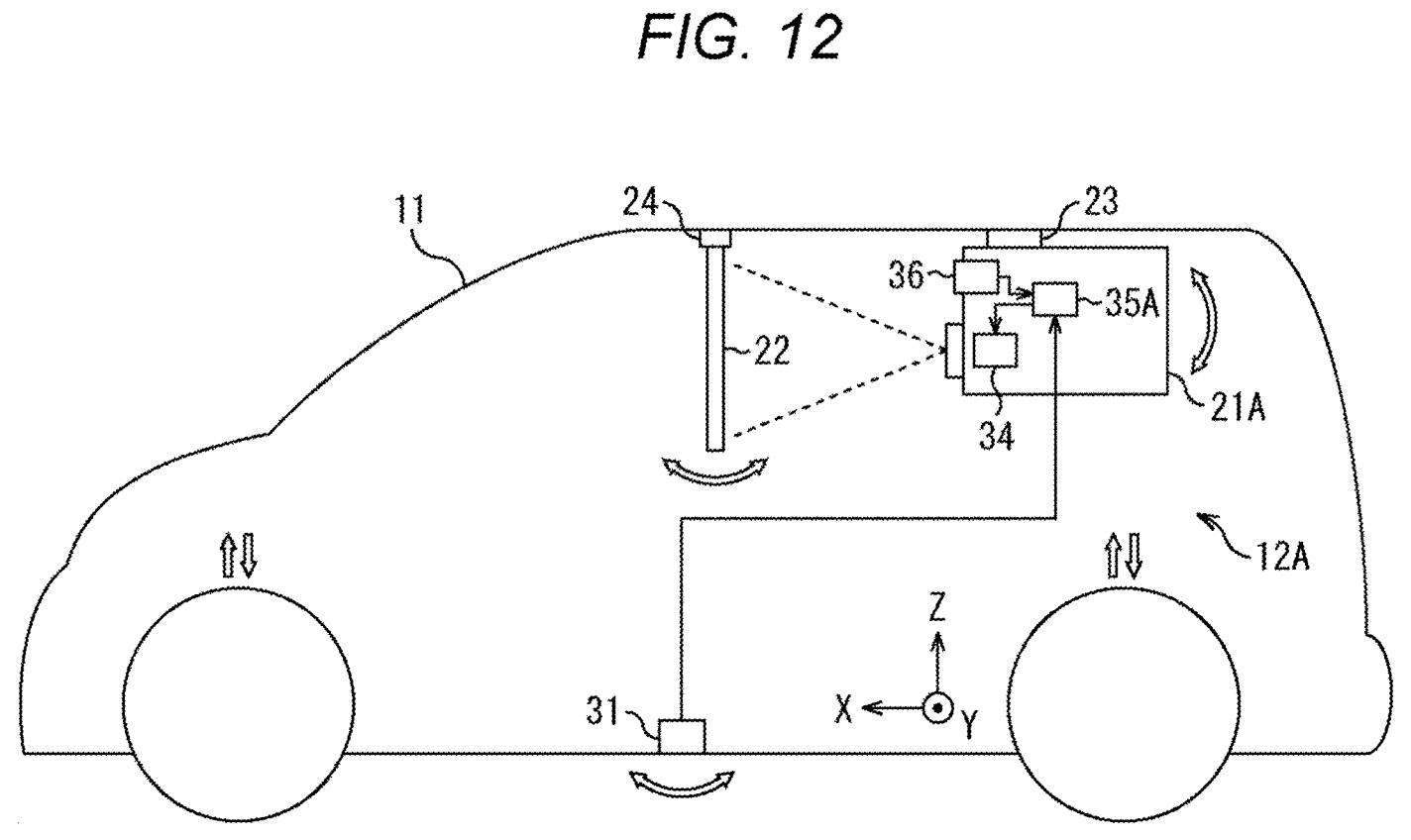

FIG. 12 is a diagram illustrating a configuration example of a second embodiment of the projection system to which the present technology is applied. Note that, in a projection system 12A illustrated in FIG. 12, components common to those of the projection system 12 in FIG. 1 are given the same reference numerals, and detailed description thereof is omitted.

As illustrated in FIG. 12, the projection system 12A has a configuration common to the projection system 12 in FIG. 1 in that the screen 22, the fixing member 23, the fixing member 24, the acceleration sensor 31, and the projection device 34 with the correction function are included.

The projection system 12A, on the other hand, is different from the projection system 12 in FIG. 1 in that a projector device 21A includes a control device 35A and a camera 36.

The camera 36 can be mounted on the projector device 21A, captures an image of the screen 22 from the projector device 21A, and outputs an image signal for detecting relative vibration between the projector device 21A and the screen 22. As the camera 36, for example, an RGB camera, an event-based vision sensor (EVS), an infrared rays (IR) light projection sensing camera, or the like may be employed.

Figure 13:
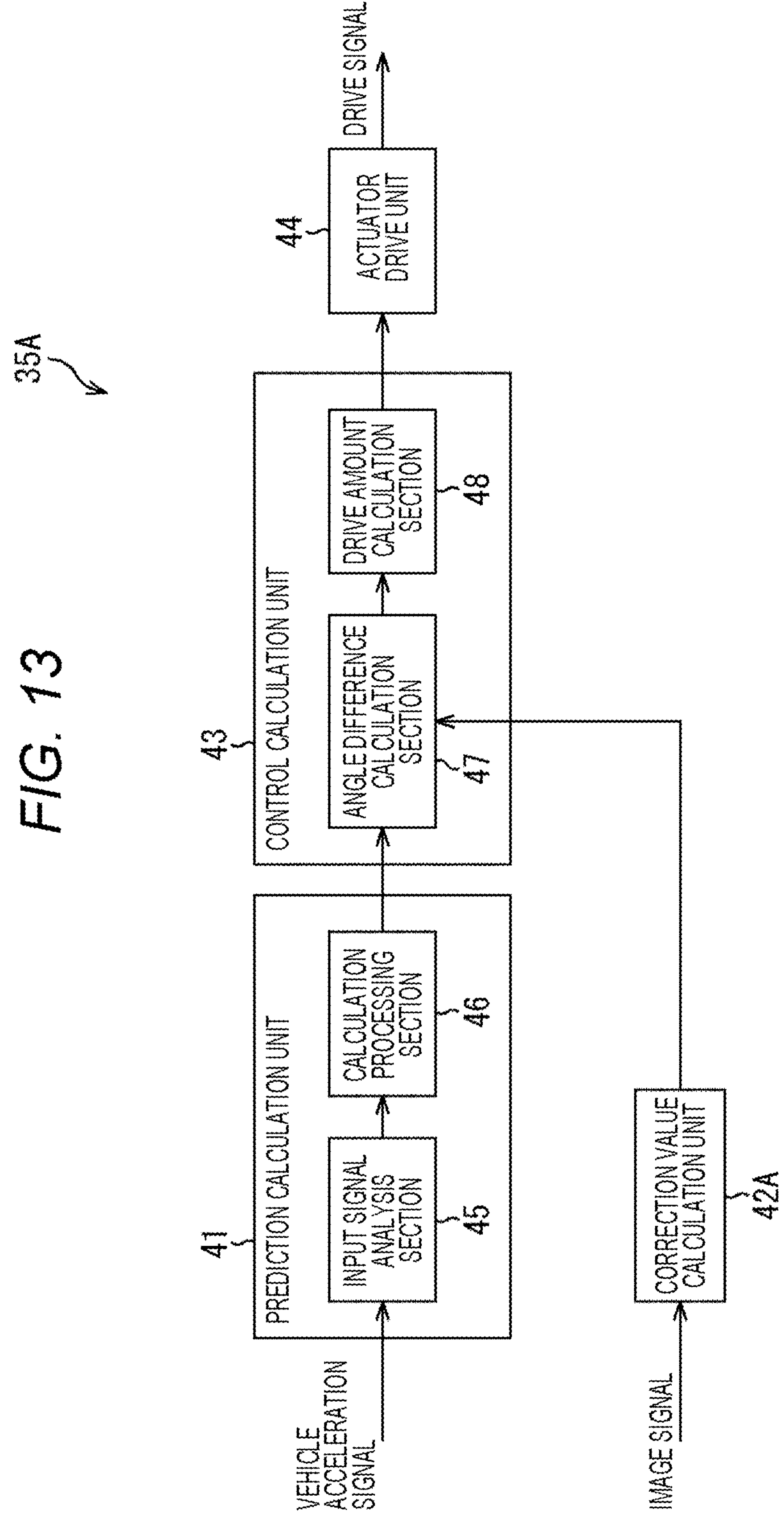
FIG. 13 is a diagram illustrating a second configuration example of the control device.

FIG. 13 is a block diagram illustrating a configuration example of the control device 35A. Note that, in the control device 35A illustrated in FIG. 13, components common to those of the control device 35 in FIG. 3 are given the same reference numerals, and detailed description thereof is omitted.

As illustrated in FIG. 13, the control device 35A has a configuration common to the control device 35 in FIG. 3 in that the prediction calculation unit 41, the control calculation unit 43, and the actuator drive unit 44 are included.

The control device 35A is different from the control device 35 in FIG. 3 in that a correction value calculation unit 42A is provided.

The correction value calculation unit 42A obtains a relative angle between the screen 22 and the projector device 21A through calculation in accordance with an image signal supplied from the camera 36 in FIG. 12, obtains a correction value based on actual measurements, and supplies the correction value to the control calculation unit 43 in order to correct an image projected on the screen 22 in such a way as to suppress vibration of the image.

FIG. 14 is a flowchart illustrating a projection damping process for suppressing vibration of an image projected on the screen 22. For example, in a case where the projection system 12A is activated and the acceleration sensor 31 outputs the vehicle acceleration signal, the process starts.

From step S31 to step S35, processing similar to that from step S11 to step S15 in FIG. 11 is performed.

In step S36, the correction value calculation unit 42A then performs calculation for obtaining a relative angle between the screen 22 and the projector device 21A in accordance with the image signal supplied from the camera 36 in FIG. 12.

In step S37, the correction value calculation unit 42A performs, on the basis of the relative angle obtained in step S36, calculation for obtaining a correction value based on the actual measurements in order to correct the image in such a way as to suppress the vibration of the image projected on the screen 22. The correction value calculation unit 42 then supplies the correction value to the control calculation unit 43.

In steps S38 to S42, processing similar to those in steps S20 to S24 in FIG. 11 is performed.

As with the projection system 12 in FIG. 1, the projection system 12A configured as described above can effectively suppress the vibration generated in the image projected on the screen 22 to such an extent that an occupant of the vehicle 11 is not bothered by the vibration.

Third Configuration Example of Projection System

Figure 15:
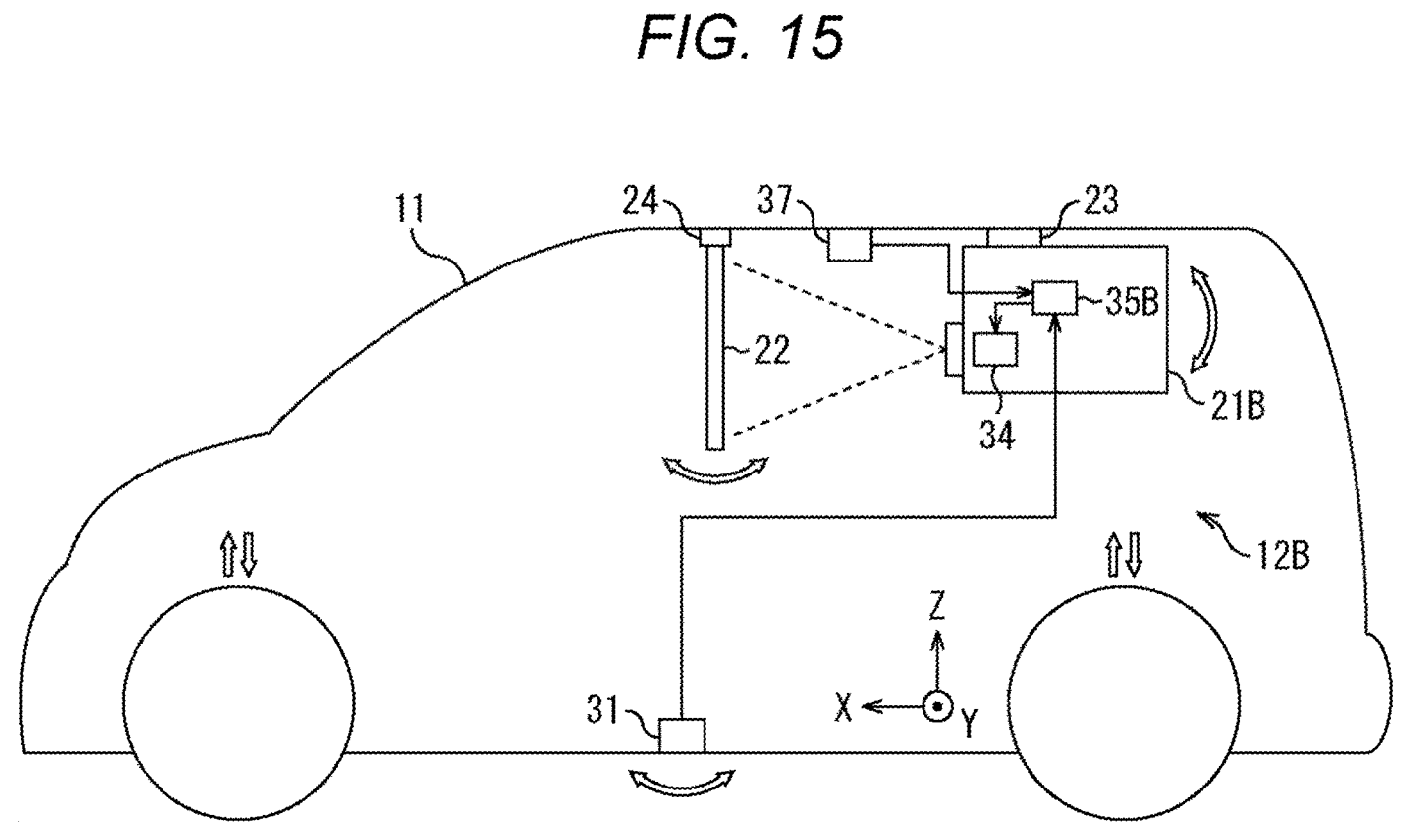

FIG. 15 is a diagram illustrating a configuration example of a third embodiment of the projection system to which the present technology is applied. Note that, in a projection system 12B illustrated in FIG. 15, components common to those of the projection system 12 in FIG. 1 are given the same reference numerals, and detailed description thereof is omitted.

As illustrated in FIG. 15, the projection system 12B has a configuration common to the projection system 12 in FIG. 1 in that the screen 22, the fixing member 23, the fixing member 24, the acceleration sensor 31, and the projection device 34 with the correction function are included.

The projection system 12B, on the other hand, has a configuration different from that of the projection system 12 in FIG. 1 in that the projector device 21B includes a control device 35B and the vehicle 11 is provided with a camera 37.

The camera 36 is mounted on vehicle 11 in such a way as to be capable of capturing images of both the projector device 21B and the screen 22, captures images of both the projector device 21B and the screen 22, and outputs an image signal for detecting relative vibration of the projector device 21B and the screen 22. As the camera 37, for example, an RGB camera, an EVS, an IR light projection sensing camera, or the like may be employed. Note that two cameras 37 may be used.

Figure 16:
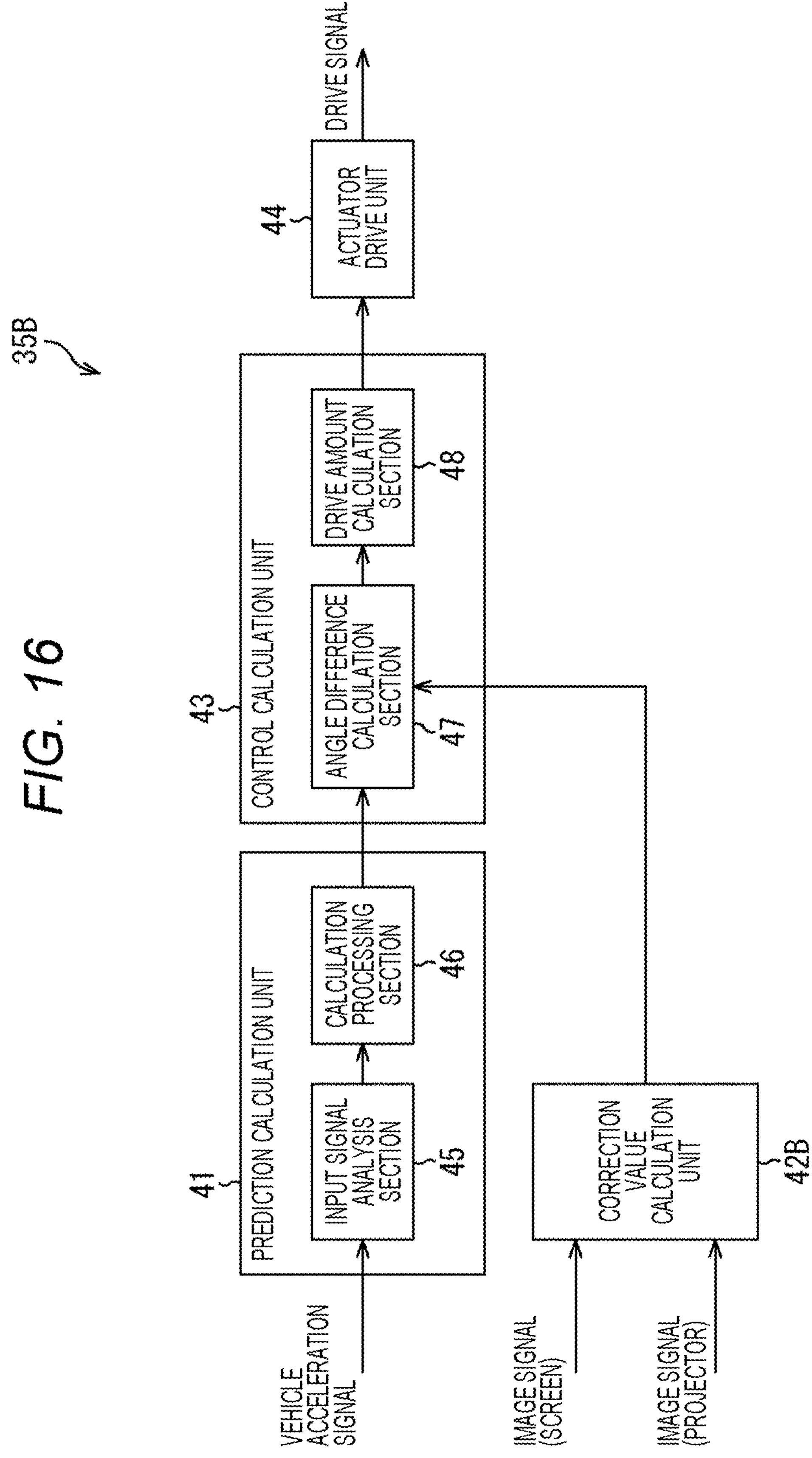
FIG. 16 is a diagram illustrating a third configuration example of the control device.

FIG. 16 is a block diagram illustrating a configuration example of the control device 35B. Note that, in the control device 35B illustrated in FIG. 16, components common to those of the control device 35 in FIG. 3 are given the same reference numerals, and detailed description thereof is omitted.

As illustrated in FIG. 16, the control device 35B has a configuration common to the control device 35 in FIG. 3 in that the prediction calculation unit 41, the control calculation unit 43, and the actuator drive unit 44 are included.

The control device 35B is different from the control device 35 in FIG. 3 in that a correction value calculation unit 42B is provided.

An image signal obtained by capturing an image of the screen 22 using the camera 37 in FIG. 15 and an image signal obtained by capturing an image of the projector device 21B are supplied to the correction value calculation unit 42B. The correction value calculation unit 42B then obtains a relative angle between the screen 22 and the projector device 21B through calculation in accordance with these image signals, obtains a correction value based on the actual measurements, and supplies the correction value to the control calculation unit 43 in order to correct an image in such a way as to suppress vibration of the image projected on the screen 22.

Figure 17:
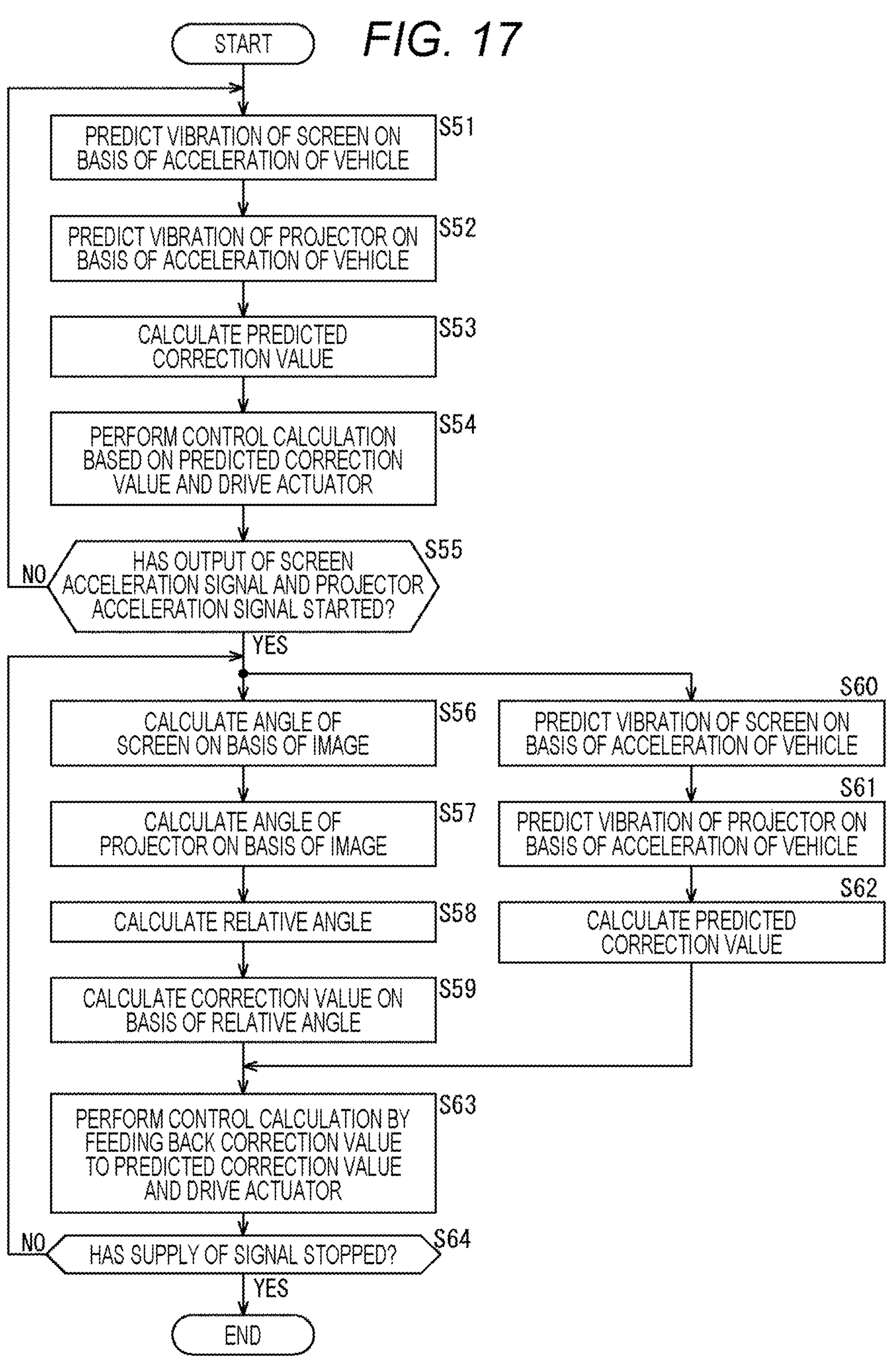
FIG. 17 is a flowchart illustrating a third projection damping process.

FIG. 17 is a flowchart illustrating a projection damping process for suppressing vibration of an image projected on the screen 22. For example, in a case where the projection system 12B is activated and the acceleration sensor 31 outputs the vehicle acceleration signal, the process starts.

From step S51 to step S55, processing similar to that from step S11 to step S15 in FIG. 11 is performed.

In step S56, the correction value calculation unit 42B performs calculation for obtaining an angle (actual measurement) of the screen 22 according to vibration generated in the screen 22 in accordance with an image signal obtained by capturing an image of the screen 22 supplied from the camera 37 in FIG. 15.

In step S57, the correction value calculation unit 42B performs calculation for obtaining an angle (actual measurement) of the projector device 21B according to vibration generated in the projector device 21B in accordance with an image signal obtained by capturing an image of the projector device 21B supplied from the camera 37 in FIG. 15.

In steps S58 to S64, processing similar to those in steps S18 to S24 in FIG. 11 is performed.

As with the projection system 1 in FIG. 1, the projection system 12B configured as described above can effectively suppress the vibration generated in the image projected on the screen 22 to such an extent that an occupant of the vehicle 11 is not bothered by the vibration.

Fourth Configuration Example of Projection System

Figure 18:
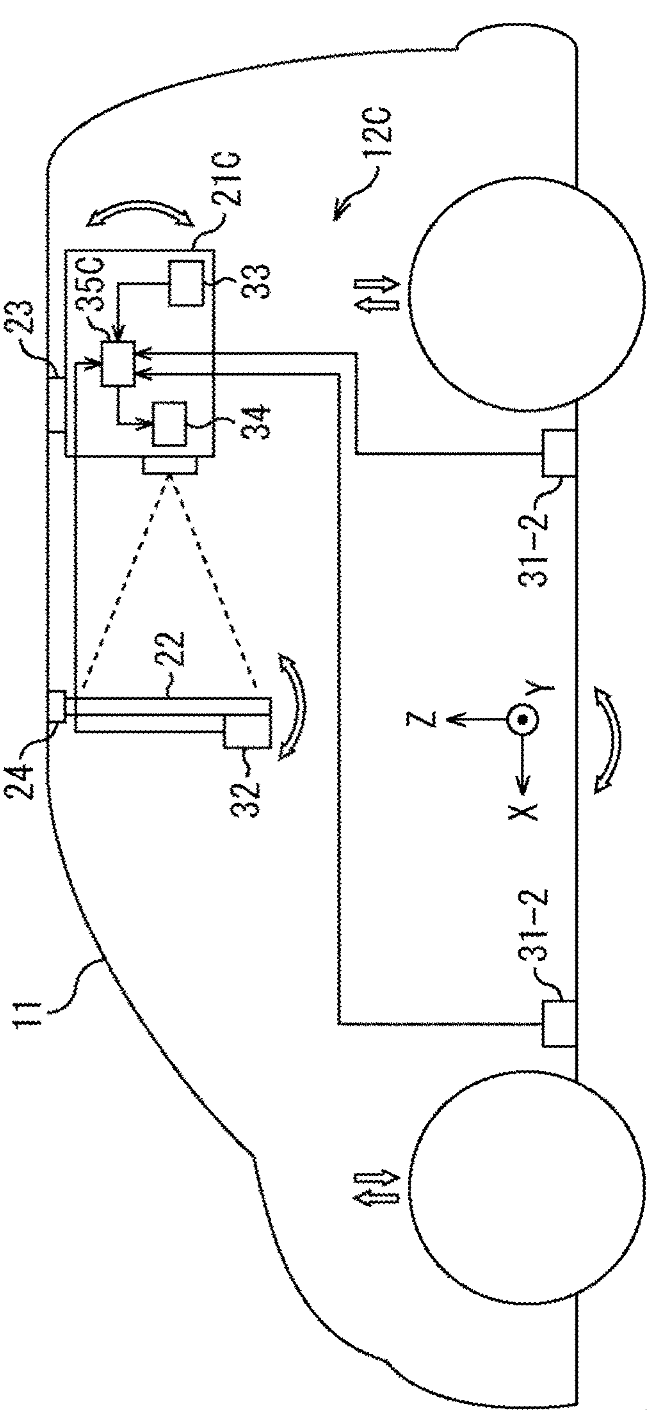
FIG. 18 is a block diagram illustrating a configuration example of a fourth embodiment of the projection system to which the present technology is applied.

FIG. 18 is a diagram illustrating a configuration example of a fourth embodiment of the projection system to which the present technology is applied. Note that, in a projection system 12C illustrated in FIG. 18, components common to those of the projection system 12 in FIG. 1 are given the same reference numerals, and detailed description thereof is omitted.

As illustrated in FIG. 18, the projection system 12C has a configuration common to the projection system 12 in FIG. 1 in that the screen 22, the fixing member 23, the fixing member 24, the acceleration sensor 32, the acceleration sensor 33, and the projection device 34 with the correction function are included.

The projection system 12C, on the other hand, is different from the projection system 12 in FIG. 1 in that a projector device 21C includes a control device 35C and acceleration sensors 31-1 and 31-2 are attached to the bottom of the vehicle 11.

The acceleration sensor 31-1 is disposed near the front tires of the vehicle 11, detects acceleration of vibration generated in a front part of the vehicle 11, and supplies a vehicle front acceleration signal, which is a signal indicating magnitude of the acceleration, to the control device 35.

The acceleration sensor 31-2 is disposed near the rear tires of the vehicle 11, detects acceleration of vibration generated in a rear part of the vehicle 11, and supplies a vehicle rear acceleration signal, which is a signal indicating magnitude of the acceleration, to the control device 35.

Note that the acceleration sensor 31 may be disposed in the vicinity of each of the four tires of the vehicle 11, for example, instead of in the front and rear parts of the vehicle 11.

Figure 19:
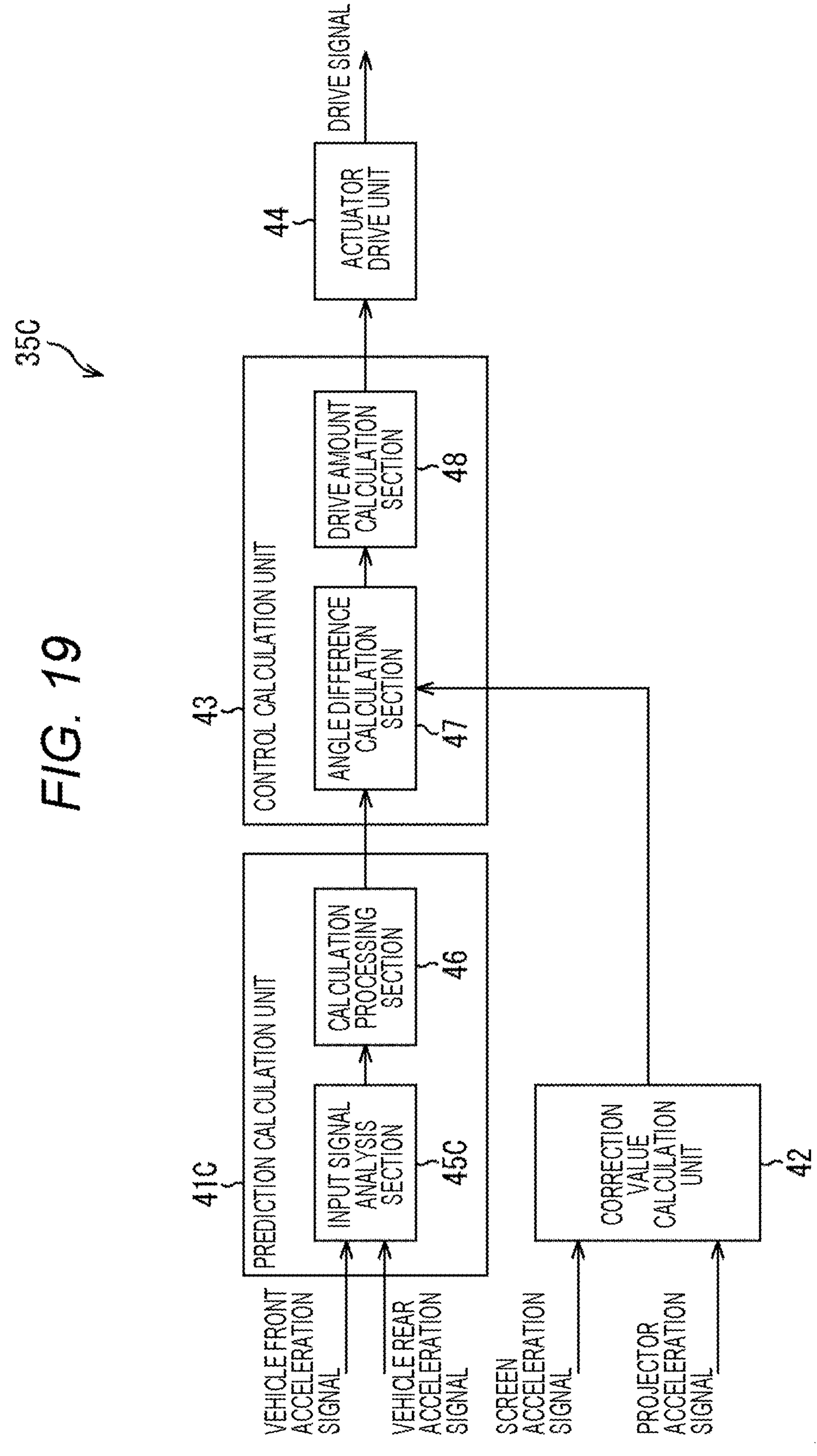
FIG. 19 is a diagram illustrating a fourth configuration example of the control device.

FIG. 19 is a block diagram illustrating a configuration example of the control device 35C. Note that, in the control device 35C illustrated in FIG. 19, components common to those of the control device 35 in FIG. 3 are given the same reference numerals, and detailed description thereof is omitted.

As illustrated in FIG. 19, the control device 35C has a configuration common to the control device 35 in FIG. 3 in that the correction value calculation unit 42, the control calculation unit 43, and the actuator drive unit 44 are included.

The control device 35C, on the other hand, is different from the control device 35 in FIG. 3 in that a prediction calculation unit 41C is included.

The vehicle front acceleration signal output from the acceleration sensor 31-1 in FIG. 18 and the vehicle rear acceleration signal output from the acceleration sensor 31-2 in FIG. 18 are supplied to the prediction calculation unit 41C. The prediction calculation unit 41C analyzes the vehicle front acceleration signal and the vehicle rear acceleration signal, and predicts vibration to be generated in the screen 22 and the projector device 21C. For example, since input vibration generated in the vehicle 11 varies depending on forward movement or backward movement of the vehicle 11, the prediction calculation unit 41C can appropriately predict the vibration. The prediction calculation unit 41C then performs calculation processing for obtaining predicted angles of the screen 22 and the projector device 21 according to the predicted vibration.

FIG. 20 is a flowchart illustrating a projection damping process for suppressing vibration of an image projected on the screen 22. For example, in a case where the projection system 12C is activated and the vehicle front acceleration signal and the vehicle rear acceleration signal are output from the acceleration sensors 31-1 and 31-2, the process starts.

In step S71, the prediction calculation unit 41C performs calculation processing for analyzing the vehicle front acceleration signal and the vehicle rear acceleration signal supplied from the acceleration sensors 31-1 and 31-2, predicting vibration to be generated in the screen 22, and obtaining a predicted angle of the screen 22 according to the predicted vibration.

In step S12, the prediction calculation unit 41C performs calculation processing for analyzing the vehicle front acceleration signal and the vehicle rear acceleration signal supplied from the acceleration sensors 31-1 and 31-2, predicting vibration to be generated in the projector device 21C, and obtaining a predicted angle of the projector device 21C according to the predicted vibration.

Thereafter, in steps S73 to S84, processing similar to that in steps S13 to S24 in FIG. 11 is performed.

The projection system 12C configured as described above can effectively suppress the vibration generated in the image projected on the screen 22 to such an extent that an occupant of the vehicle 11 is not bothered by the vibration as with the projection system 1 in FIG. 1.

Configuration Example of Computer

Next, the series of processes (control method) described above can be performed by hardware or software. In a case where the series of the processes is performed by the software, a program configuring the software is installed on a general-purpose computer, and the like.

Figure 21:
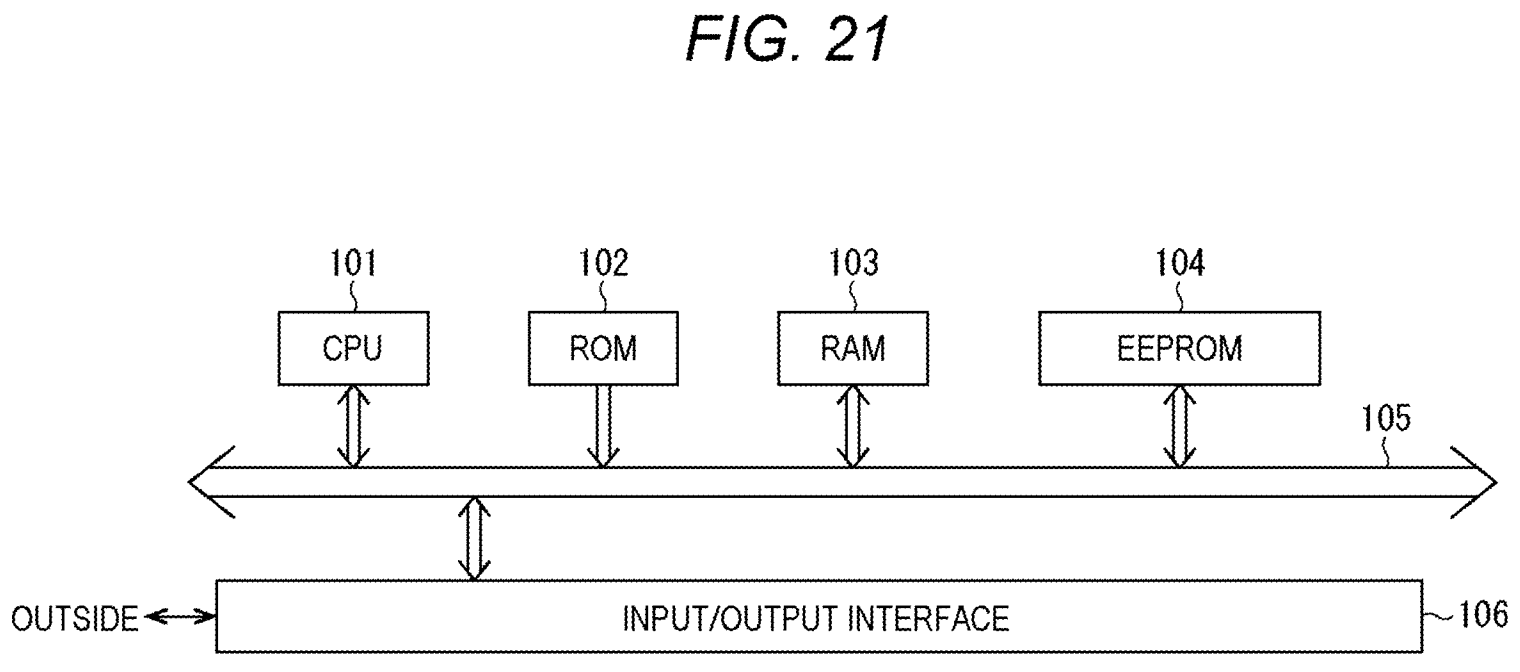

FIG. 21 is a block diagram illustrating a configuration example of one embodiment of the computer on which the program for executing the above-described series of processing is installed.

In the computer, a central processing unit (CPU) 101, a read only memory (ROM) 102, a random access memory (RAM) 103, and an electronically erasable and programmable read only memory (EEPROM) 104 are connected to each other by a bus 105. Moreover, an input/output interface 106 is connected to the bus 105, and the input/output interface 106 is connected to the outside.

In the computer configured as described above, for example, the CPU 101 loads a program stored in the ROM 102 and the EEPROM 104 into the RAM 103 via the bus 105 and executes the program, whereby the above-described series of processing is performed. Furthermore, the program executed by the computer (CPU101) can be written in advance in the ROM 102, and can be installed or updated in the EEPROM 104 from the outside via the input/output interface 106.

Here, in the present description, the process to be performed by the computer in accordance with the program is not necessarily performed in time series according to orders described in the flowcharts. That is, the processing to be performed by the computer in accordance with the program includes processing to be executed in parallel or independently of one another (parallel processing or object-based processing, for example).

Furthermore, the program may be processed by one computer (one processor) or processed in a distributed manner by a plurality of computers. Moreover, the program may be transferred to a distant computer to be executed.

Moreover, in the present description, a system means a set of a plurality of components (devices, modules (parts), and the like), and it does not matter whether or not all the components are in the same housing. Therefore, a plurality of devices housed in separate housings and connected to each other via a network and one device in which a plurality of modules is housed in one housing are both systems.

Furthermore, for example, a configuration described as one device (or one processing unit) may be divided and configured as the plurality of the devices (or the processing units). Conversely, configurations described above as a plurality of devices (or processing units) may be collectively configured as one device (or processing unit). Furthermore, it goes without saying that a configuration other than the above-described configurations may be added to the configuration of each device (or each processing unit). Moreover, in a case where the configuration and operation as the entire system are substantially the same, a part of the configuration of a certain device (or processing unit) may be included in the configuration of another device (or another processing unit).

Furthermore, for example, the present technology can be configured as cloud computing in which one function is shared and jointly processed by the plurality of the devices through the network.

Furthermore, for example, the program described above can be executed by any device. In this case, the device is only required to have a necessary function (functional block and the like) and obtain necessary information.

Furthermore, for example, each Step described in the flowcharts described above can be executed by one device, or can be executed in a shared manner by the plurality of the devices. Moreover, in a case where a plurality of processes is included in one Step, the plurality of the processes included in the one Step can be executed by one device or shared and executed by the plurality of the devices. In other words, the plurality of the processes included in one Step can also be executed as processes of a plurality of Steps. Conversely, the processes described as the plurality of the steps can also be collectively executed as one Step.

Note that, in the program to be executed by the computer, the processes in Steps describing the program may be executed in time series in the order described in the present description, or may be executed in parallel, or independently at a necessary timing such as a case where a call is made. That is, unless there is a contradiction, the process in the each Step may also be executed in an order different from the orders described above. Moreover, the processes in the steps describing the program may be executed in parallel with processes of another program, or may be executed in combination with processes of the other program.

Note that, a plurality of the present technologies that has been described in the present description can each be implemented independently as a single unit unless there is a contradiction. Of course, a plurality of arbitrary present technologies can be implemented in combination. For example, a part or all of the present technologies described in any of the embodiments can be implemented in combination with a part or all of the present technologies described in other embodiments.

Furthermore, a part or all of any of the above-described present technologies can be implemented together with another technology that is not described above.

Examples of Combination of Configurations

Note that the present technology can also have the following configurations.

(1)

A projection system including:

a prediction calculation unit that analyzes a first acceleration signal output from a first acceleration sensor provided at a bottom of a vehicle, that predicts vibration to be generated in a screen and a projector device fixed to a ceiling of the vehicle, and that obtains a predicted correction value based on the prediction;

a correction value calculation unit that obtains a correction value based on actual measurements in accordance with relative behavior of the screen and the projector device; and a control calculation unit that performs control calculation by feeding back the correction value to the predicted correction value and that obtains an amount of drive of an actuator for suppressing vibration of an image projected on the screen.

(2)

The projection system according to (1), in which the control calculation unit performs control calculation based on the predicted correction value supplied from the prediction calculation unit until the correction value is supplied from the correction value calculation unit.

(3)

The projection system according to (1) or (2), in which the prediction calculation unit includes an analysis section that analyzes frequency and amplitude of vibration of the vehicle indicated by the first acceleration signal and that determines on/off of control for suppressing vibration of an image projected on the screen in accordance with a result of the analysis.

(4)

The projection system according to (3), in which the analysis section determines on/off of the control on the basis of visibility of the image.

(5)

The projection system according to any one of (1) to (4), in which the correction value calculation unit obtains the correction value by using a second acceleration signal output from a second acceleration sensor provided for the screen and a third acceleration signal output from a third acceleration Sensor provided for the projector device.

(6)

The projection system according to any one of (1) to (4), in which the correction value calculation unit obtains the correction value using an image signal obtained, from a camera provided for the projector device, by capturing an image of the screen.

(7)

The projection system according to any one of (1) to (4), in which the correction value calculation unit obtains the correction value by using image signals obtained by capturing images of the projector device and the screen using a camera provided for the vehicle.

(8)

The projection system according to any one of (1) to (7), in which the prediction calculation unit obtains the predicted correction value by analyzing a plurality of the first acceleration signals output from a plurality of the first acceleration sensors provided at the bottom of the vehicle.

(9)

A control device including:

a prediction calculation unit that analyzes a first acceleration signal output from a first acceleration sensor provided at a bottom of a vehicle, that predicts vibration to be generated in a screen and a projector device fixed to a ceiling of the vehicle, and that obtains a predicted correction value based on the prediction;

a correction value calculation unit that obtains a correction value based on actual measurements in accordance with relative behavior of the screen and the projector device; and a control calculation unit that performs control calculation by feeding back the correction value to the predicted correction value and that obtains an amount of drive of an actuator for suppressing vibration of an image projected on the screen.

(10)

A control method performed by a control device, the control method including:

analyzing a first acceleration signal output from a first acceleration sensor provided at a bottom of a vehicle, predicting vibration to be generated in a screen and a projector device fixed to a ceiling of the vehicle, and obtaining a predicted correction value based on the prediction;

obtaining a correction value based on actual measurements in accordance with relative behavior of the screen and the projector device; and performing control calculation by feeding back the correction value to the predicted correction value, and obtaining an amount of drive of an actuator for suppressing vibration of an image projected on the screen.

Note that the present embodiment is not limited to the embodiment described above, and various modifications can be made without departing from the gist of the present disclosure. Furthermore, the effects described in the present description are merely examples and are not limited, and other effects may be produced.

REFERENCE SIGNS LIST

11 Vehicle
12 Projection system
21 Projector device
22 Screen
23, 24 Fixing member
31 to 33 Acceleration sensor
34 Projection device with correction function
35 Control device
36, 37 Camera
41 Prediction calculation unit
42 Correction value calculation unit
43 Control calculation unit
44 Actuator drive unit
45 Input signal analysis section
46 Calculation processing section
47 Angle difference calculation section
48 Drive amount calculation section
51 Light source
52 Transmissive liquid crystal panel
53 Optical system
54 Mirror
55 Actuator
56 Control lens
57 Prism mirror
58 Shift transmissive liquid crystal panel

The invention claimed is:

1. A projection system comprising:

a prediction calculation unit that analyzes a first acceleration signal output from a first acceleration sensor provided at a bottom of a vehicle, that predicts vibration to be generated in a screen and a projector device fixed to a ceiling of the vehicle, and that obtains a predicted correction value based on the prediction;

a correction value calculation unit that obtains a correction value based on actual measurements in accordance with relative behavior of the screen and the projector device; and a control calculation unit that performs control calculation by feeding back the correction value to the predicted correction value and that obtains an amount of drive of an actuator for suppressing vibration of an image projected on the screen.

2. The projection system according to claim 1, wherein the control calculation unit performs control calculation based on the predicted correction value supplied from the prediction calculation unit until the correction value is supplied from the correction value calculation unit.

3. The projection system according to claim 1, wherein the prediction calculation unit includes an analysis section that analyzes frequency and amplitude of vibration of the vehicle indicated by the first acceleration signal and that determines on/off of control for suppressing vibration of an image projected on the screen in accordance with a result of the analysis.

4. The projection system according to claim 1, wherein the correction value calculation unit obtains the correction value by using a second acceleration signal output from a second acceleration sensor provided for the screen and a third acceleration signal output from a third acceleration sensor provided for the projector device.

5. The projection system according to claim 1, wherein the correction value calculation unit obtains the correction value using an image signal obtained, from a camera provided for the projector device, by capturing an image of the screen.

6. The projection system according to claim 1, wherein the correction value calculation unit obtains the correction value by using image signals obtained by capturing images of the projector device and the screen using a camera provided for the vehicle.

7. The projection system according to claim 1, wherein the prediction calculation unit obtains the predicted correction value by analyzing a plurality of first acceleration signals, including the first acceleration signal, which is output from a plurality of first acceleration sensors, including the first acceleration sensor, provided at the bottom of the vehicle.

8. The projection system according to claim 3, wherein the analysis section determines on/off of the control on a basis of visibility of the image.

9. A control device comprising:

a prediction calculation unit that analyzes a first acceleration signal output from a first acceleration sensor provided at a bottom of a vehicle, that predicts vibration to be generated in a screen and a projector device fixed to a ceiling of the vehicle, and that obtains a predicted correction value based on the prediction;

a correction value calculation unit that obtains a correction value based on actual measurements in accordance with relative behavior of the screen and the projector device; and a control calculation unit that performs control calculation by feeding back the correction value to the predicted correction value and that obtains an amount of drive of an actuator for suppressing vibration of an image projected on the screen.

10. A control method performed by a control device, the control method comprising:

analyzing a first acceleration signal output from a first acceleration sensor provided at a bottom of a vehicle, predicting vibration to be generated in a screen and a projector device fixed to a ceiling of the vehicle, and obtaining a predicted correction value based on the prediction;

obtaining a correction value based on actual measurements in accordance with relative behavior of the screen and the projector device; and performing control calculation by feeding back the correction value to the predicted correction value, and obtaining an amount of drive of an actuator for suppressing vibration of an image projected on the screen.

* * * * *